United States Patent [19]
Clark et al.

[11] Patent Number: 5,289,397
[45] Date of Patent: Feb. 22, 1994

[54] HIGH-SPEED MODULO EXPONENTIATOR DEVICE

[75] Inventors: James M. Clark, Verona, N.J.; Michael Conforti, Monroe, N.Y.

[73] Assignee: ITT Corporation, New York, N.Y.

[21] Appl. No.: 734,228

[22] Filed: Jul. 22, 1991

[51] Int. Cl.$^5$ .............................................. G06F 7/38
[52] U.S. Cl. ..................................... 364/746; 364/749
[58] Field of Search ................... 364/746, 749, 715.01; 380/30, 46

[56] References Cited

U.S. PATENT DOCUMENTS

4,870,681 9/1989 Sedlak ................................... 364/787
5,046,094 9/1991 Kawamura ............................. 380/46

*Primary Examiner*—Long T. Nguyen
*Attorney, Agent, or Firm*—Arthur L. Plevy; Patrick M. Hogan

[57] ABSTRACT

A high-speed modulo exponentiator device employs a computation algorithm and integrated circuit ("IC") hardware implementation to perform the modulo exponentiation function of the form $C = B^E$ (Modulo M) as a series of modulo multiplication operations, which in turn are performed as a series of simple addition, multiplication and distributed modulo operations. The intermediate data maintain a bit length in the range of the bit length of the modulus value. The simplified operations are implemented via register add and shift operations in an arithmetic logic circuit. The arithmetic logic has a bit slice architecture which plural bit slices are combined to form the basic carry-save elements of the exponentiator device. The exponentiator device may be cascaded with other devices for handling numbers of longer bit lengths. Improved techniques are used for optimizing the multiplication time and for pipelining the transfer of data between cascaded elements.

18 Claims, 28 Drawing Sheets

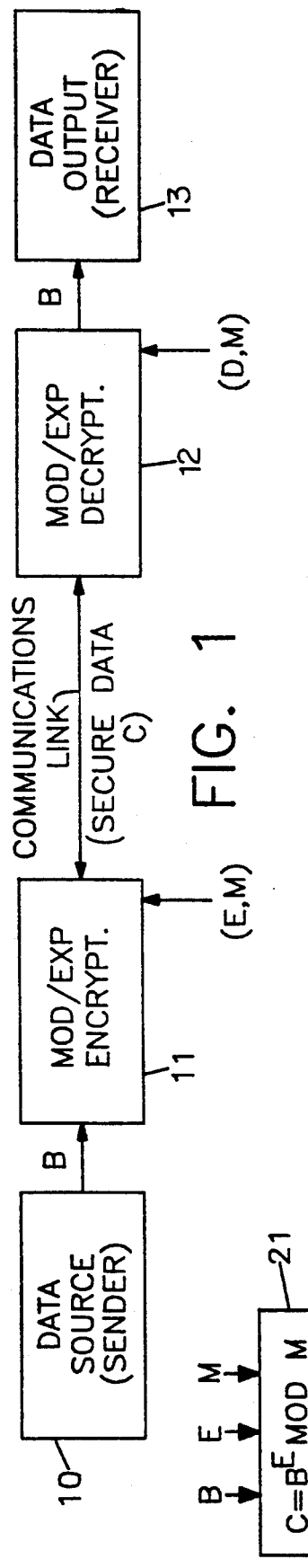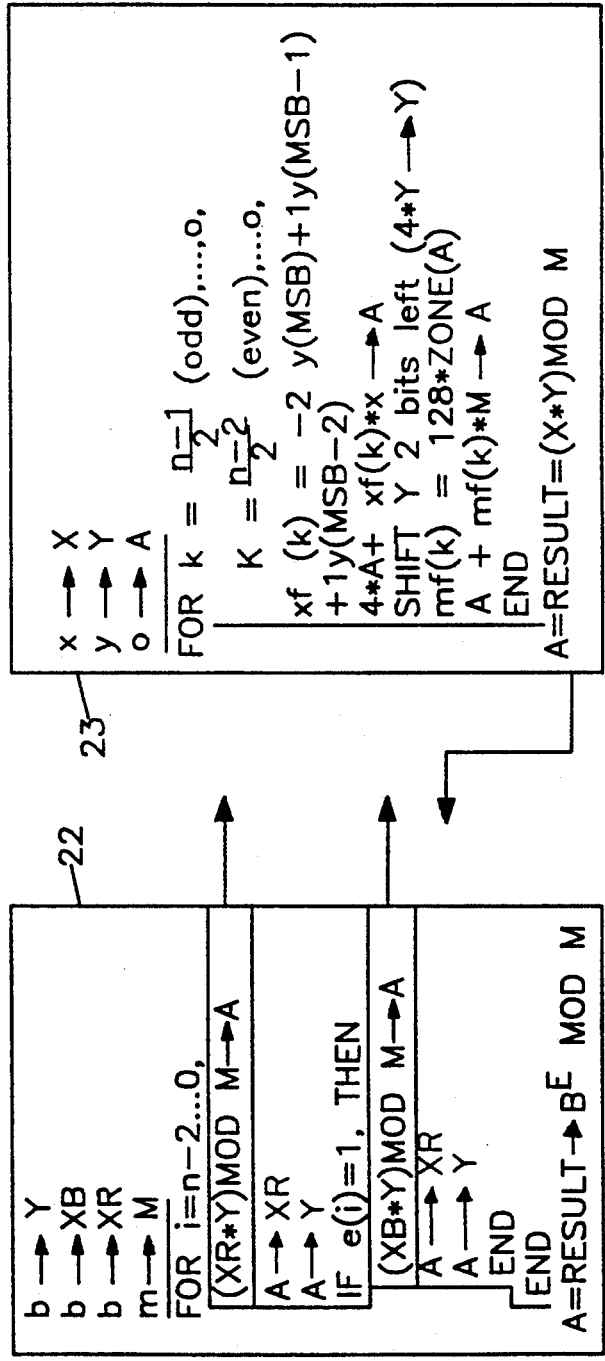

FIG. 3B

- (cr) Clock (load) XR REG
- (cb) Clock (load) XB REG
- (sx) Select X= XR (or XB)
- (cm) CLock (load) M REG
- (sm) Select E= X or 128*M
- (sf) Select F= −2,−1,0, +1, or +2 times E
- (sa) Select A, 4 A, or 0 (also for carries)
- (ca) Clock A REG (and carry FF's)
- (sy) Shift or Load Y REG
- (cy) Clock Y REG R1, R2, and H are used to propagate carries Shift of register A is used to load / unload data.

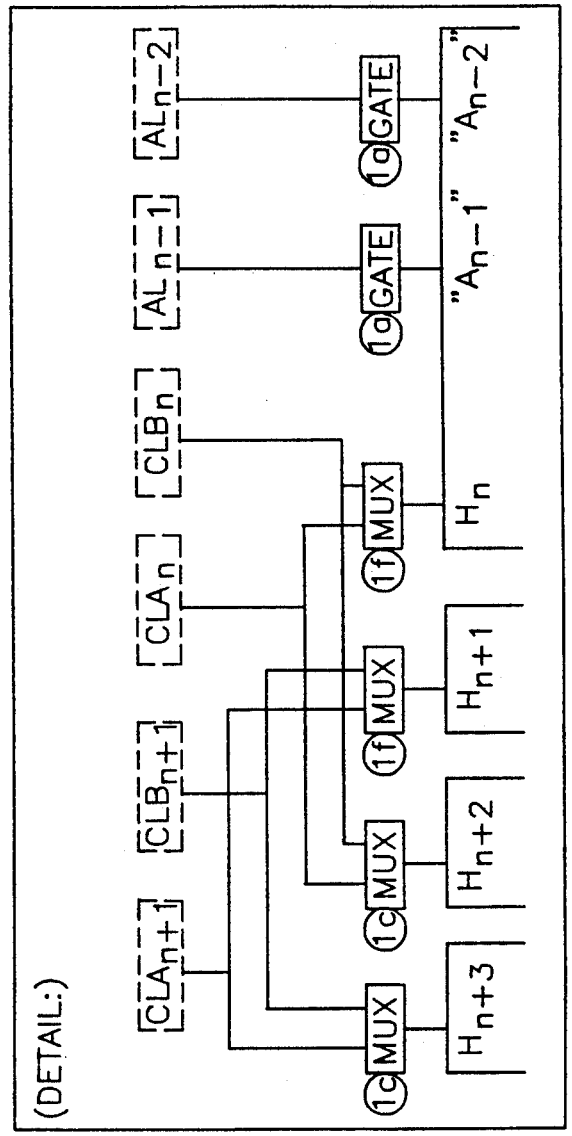
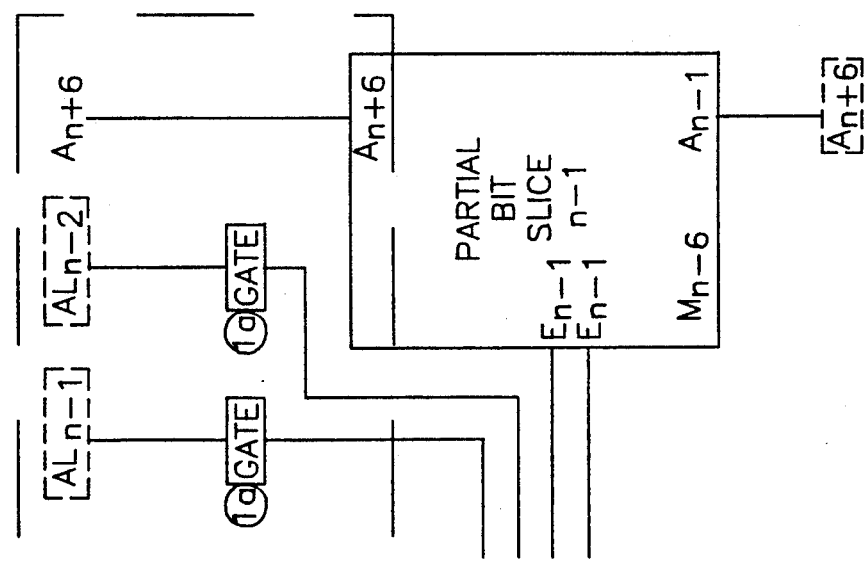
FIG. 9C

HIGH-SPEED MODULO EXPONENTIATOR DEVICE

FIELD OF THE INVENTION

This invention relates to a high-speed integrated circuit for performing the modulo exponentiation function commonly used in certain classes of encryption systems. In particular, the invention is directed to an improved algorithm for performing the modulo exponentiation function and implementation of the corresponding arithmetic logic in a high-speed gallium arsenide (GaAs) integrated circuit. Depending on system requirements, CMOS or BICMOS implementations may be preferred; this invention can be implemented in these logic forms also.

BACKGROUND OF THE INVENTION

Cryptographic developments in the last decade have identified public key systems as very desirable from an operational viewpoint. In public key systems, data to be secured is encrypted with an enciphering key, and decrypted with a deciphering key that is different from and not computable from the enciphering key. In a major class of such public key encryption systems, such as the RSA (Rivest, Shamir, Adelman), Diffie-Hellman, and SEEK (Secure Electronic Exchange of Keys) methods, data to be secured (or a message coded in numeric form) B is enciphered using a public key (E,M) to obtain a ciphertext C, as follows:

$$C = B^E \text{ (Modulo } M\text{)}$$

In this operation, the ciphertext C is the remainder of $B^E$ when divided by M. As is preferred, all quantities are large integers which may be several hundred bits long, and M is the product of two large prime numbers p and q.

The deciphering operation to retrieve the data or message B is similar except that a private key (D,M) is used, as follows:

$$B = C^D \text{ (Modulo } M\text{)}$$

Here D depends on p and q, and it is extremely difficult to compute D from E and M as it is to factor M. As an example of the RSA method, the word "IT" can be encrypted using the numeric code representation for letters A=01, B=02, ... Z=26, so that the word "IT" is represented by the number 0920. Then with M=47 * 59=2773, and E=17, the ciphertext C=$920^{17}$; (Modulo 2773)=948. Using p=47 and q=59, a value D=157 can be derived as the private key by which the original message can be calculated as $948^{157}$; (Modulo 2773)=920, which is decoded as the word "IT".

Modular arithmetic plays a large part in public key encryption systems because it uses smooth and continuous functions to obtain discontinuous values which jump around in a haphazard way. While the encryption method may be known, the security of this form of cipher rests mainly in the difficulty, if not impossibility, of computing the enciphering or deciphering values. The code breaker's work increases much more rapidly with increasing length N of the numbers used than does the work of an authorized sender or receiver. For example, if the code breaking work is proportional to $N^N$ whereas the encrypting/decrypting work is proportional to $N^3$, then doubling N from 10 to 20 makes an authorized user's work 8 times greater but the code breaker's work 4010 greater.

For further information regarding such public key systems and modular arithmetic encryption functions, reference is made to the article entitled "The Mathematics of Public Key Cryptography" by Martin Hellman, published in Scientific American Magazine, August 1979, Vol. 241, No. 2, pages 146 to 157.

A described above, using a public key for encryption and a secret key for description prevents a third party from extracting processed information from a communication system. But also, using a secret key for encryption ("signing a message") and a public key for decryption ("reading the signature") prevents a third party from inserting bogus information into a communication system.

The implementation of such public key encryption systems depends upon the ability to perform the mathematical modulo exponentiation function quickly and within given hardware constraints. Existing silicon-based circuit devices typically can perform a 512-bit computation in tens or hundreds of milliseconds (ms). The rather long computation time makes this encryption technique suitable only for key management and low-rate data applications. Such existing devices also exhibit severely degraded performance when they are cascaded to support a higher precision arithmetic. Furthermore, secure data transmission, a rapidly growing application, requires authentication of lengthy packets which could greatly increase the computation time. High data rate applications and real-time performance in image or voice communication systems would require at least a tenfold reduction in current exponentiation computation times in order to be feasible for implementation.

SUMMARY OF THE INVENTION

Accordingly, it is principal purpose of the invention to provide an improved computation algorithm for performing modulo exponentiation functions which can greatly reduce the computation time so that this encryption method becomes feasible for securing lengthy data transmissions, high data rate applications, and real-time performance in image and voice communication systems. Particularly, it is desirable to implement the improved algorithm in a high-speed gallium arsenide (GaAs) integrated circuit, and to provide an efficient IC architecture which employs low bit lengths for the memory and processing elements and reduces delays in the transfer of data between cascaded elements.

The invention employs an innovative computation algorithm and hardware implementation to perform the modulo exponentiation function as a series of modulo multiplication operations. Each modulo multiplication operation in turn is performed as a series of addition, multiplication and distributed modulo operations which are simple in form and maintain a bit length comparable to the final result. The modulo exponentiation and modulo multiplication operations are implemented as add and shift operations in a set of registers of an arithmetic logic circuit device. The arithmetic logic circuit device has a bit slice architecture of similar units. The circuit device may be cascaded with other devices for handling numbers of longer bit lengths. Improved techniques are used for optimizing the multiplication time and for pipelining the transfer of data between cascaded elements. A cascaded GaAs design uses a transparent interchip delay that will allow one clock period for the transfer of data between ICs without any loss of performance. Test analysis indicates that the modulo exponentiator device of the invention can perform a 512-bit modulo exponentiation function in under 2 ms, as compared to a 25 ms execution time with the highest speed devices currently available.

BRIEF DESCRIPTION OF THE DRAWINGS

FIG. 1 is a schematic diagram of a public key encryption system having encryption and decryption modules for performing respective modulo exponentiation functions.

FIG. 2 is a conceptual diagram of a computation algorithm for performing the modulo exponentiation function in accordance with the present invention.

FIGS. 3A and 3B are a schematic diagram of the architecture of an IC implementation of a "bit slice" component used in performing the improved computation algorithm.

FIGS. 9A-9C show connections between bit slice components that comprise a larger component which we call an "in-boundary carry-save slice".

DETAILED DESCRIPTION OF PREFERRED EMBODIMENTS

Figure 3A:
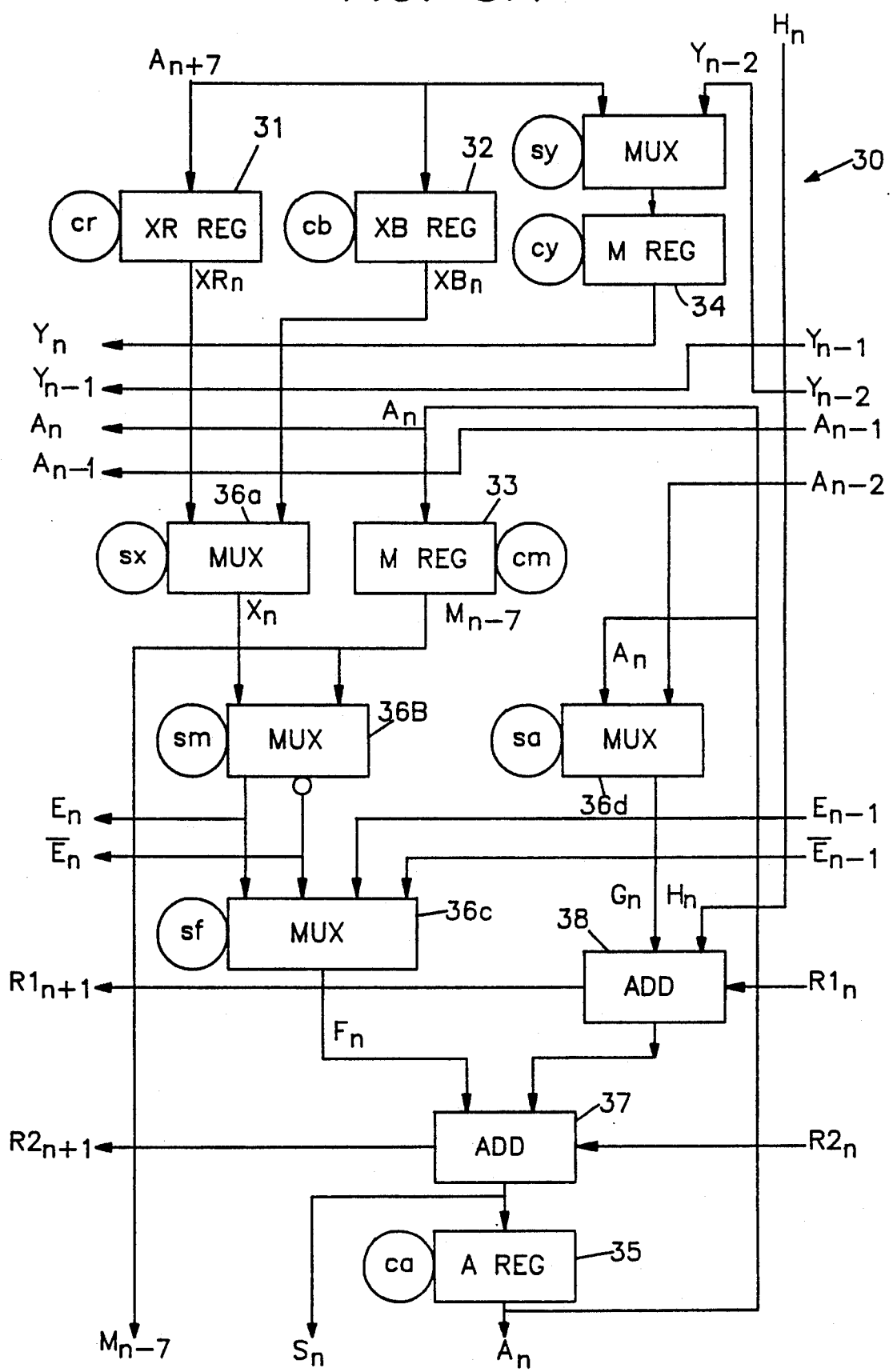

A modulo exponentiator device is described herein which is used to secure data transmitted between a sender and a receiver using a public key system. As illustrated in FIG. 1, data B from a data source 10 is encrypted by a modulo exponentiator 11, based upon a public key (E,M), prior to transmission as secure ciphertext C on a communications link. The encrypted data is decrypted on the receiving end by a complementary modulo exponentiator 12 using a private key (D,M) to recover the original data B for the data output 13. The modulo exponentiators 11, 12 are used to compute the functions $C=B^E$(Modulo M) and $B=C^D$(Modulo M), respectively, as described previously.

In the following description, with reference to FIG. 2, we first describe the invention algorithm for computing a modulo exponentiation through a series of modulo multiplication operations, which are themselves computed by doing a series of simpler addition, multiplication, and distributed modulo operations. The addition of very large integers is also described using cascaded devices with a reasonable tradeoff of speed, logic size, and complexity.

Figure 4A:
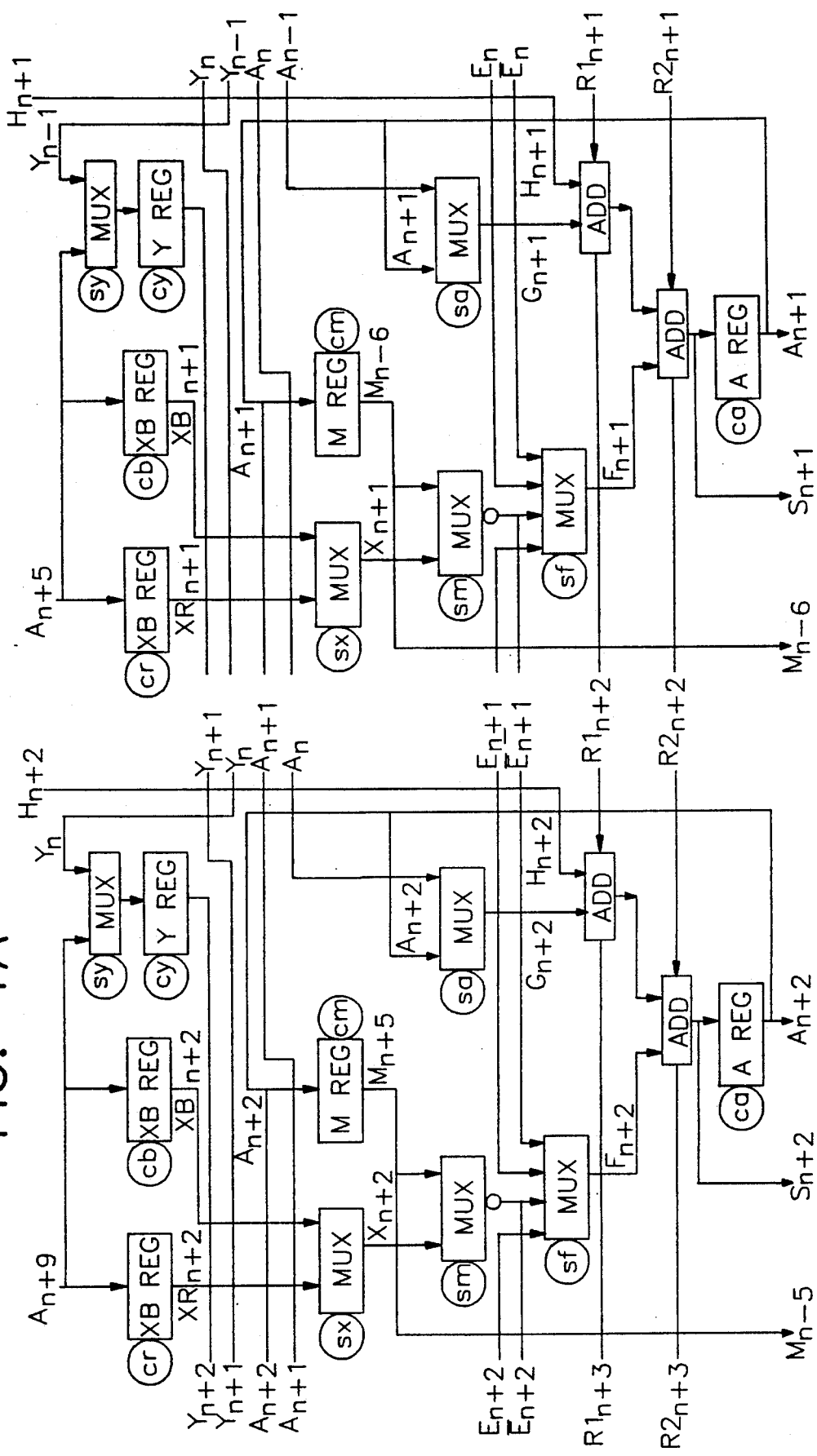
FIGS. 4A and 4B show typical side connections between bit slice components as illustrated in FIG. 3.
Figure 4B:
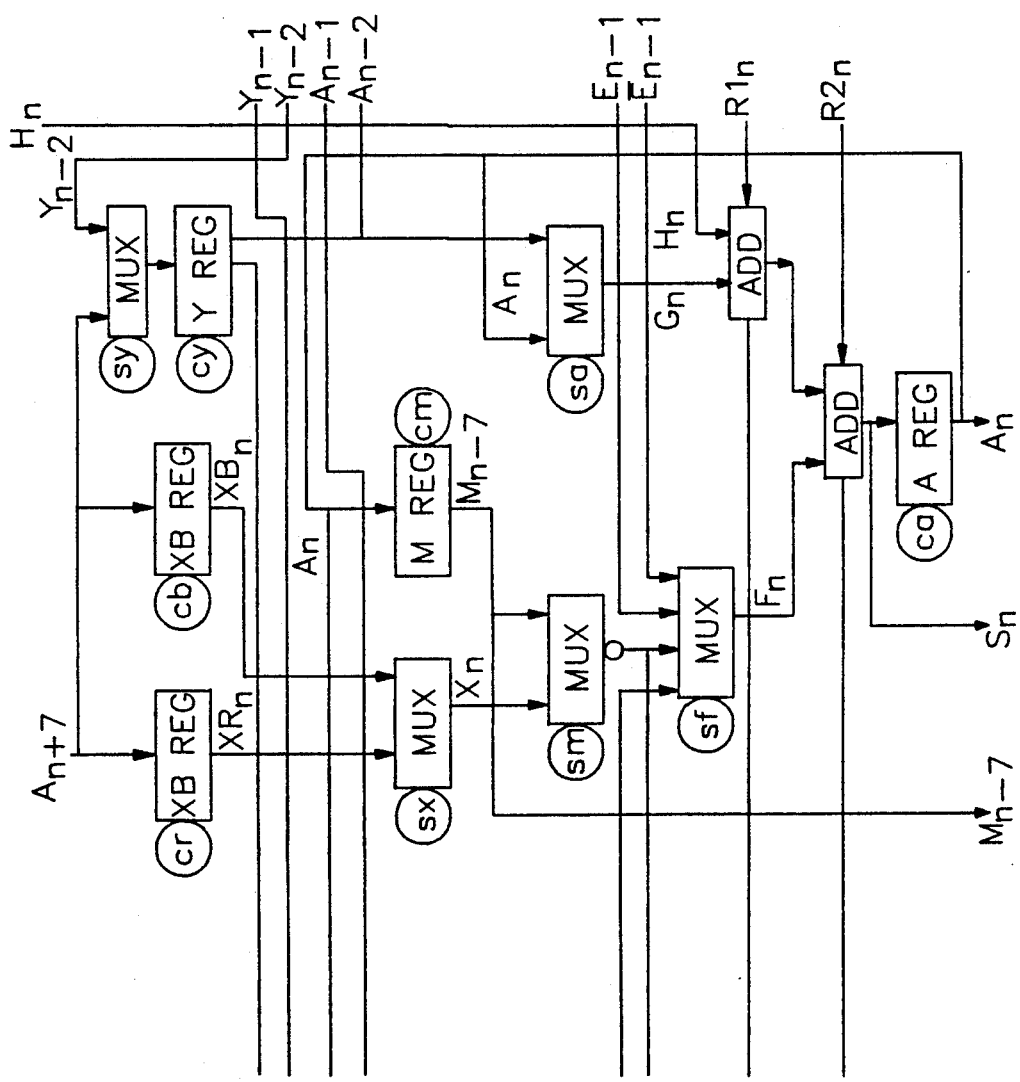

We next describe the arithmetic logic for implementing these algorithms in a bottom-up, or inside-out, sequence (that is, sequence of description, not sequence of implementation or operation). We begin with the "bit slice" component, as shown in FIG. 3, which includes all of the logic and storage for one bit position of the arithmetic. As shown in FIG. 4, the bit slices are connected with similar units to make up the n bits of the registers. We also describe how a "carry-save slice" is made of eight bit slices and a few more parts, and define a few special varieties of these slices.

Figure 11:
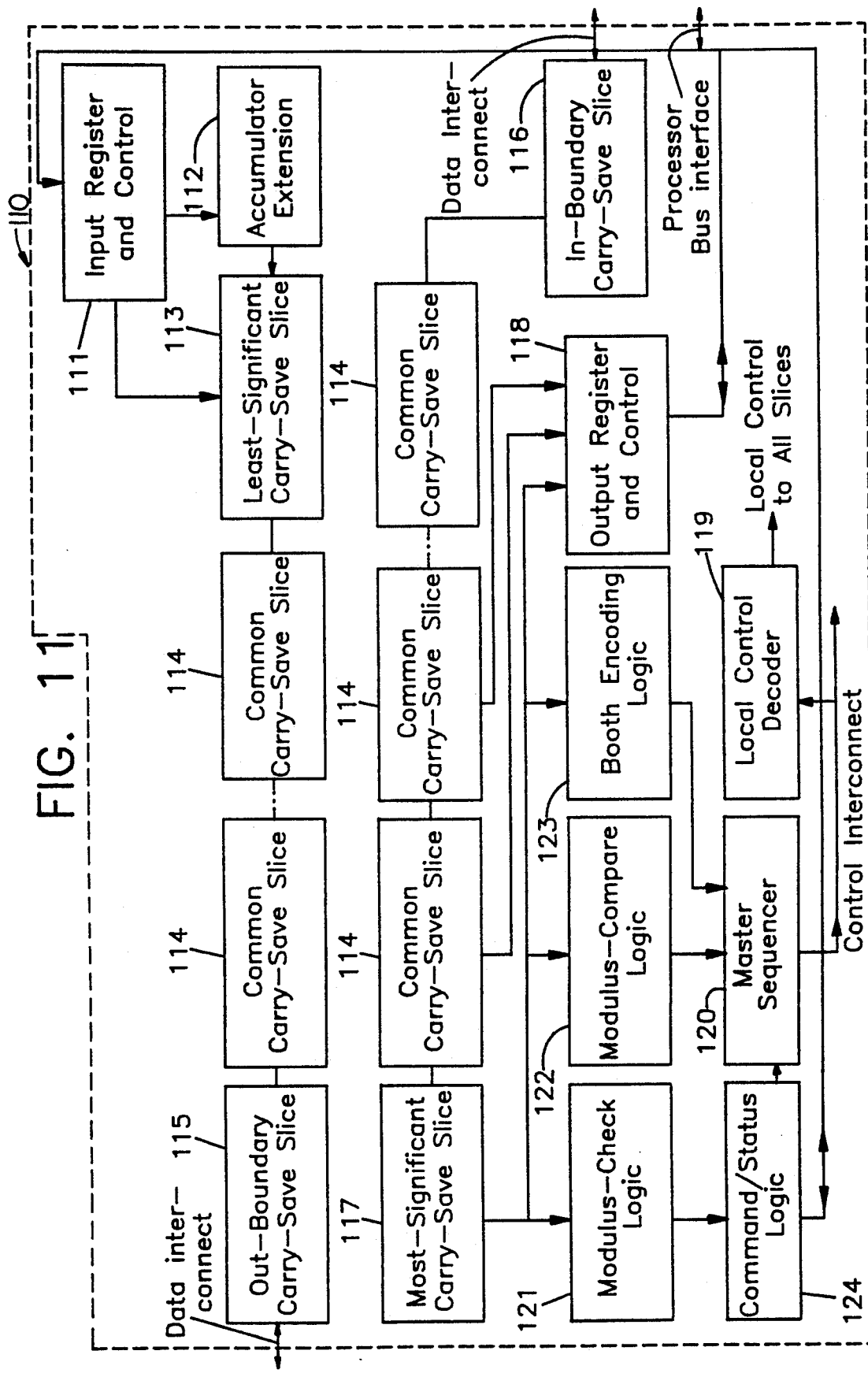
FIG. 11 is a schematic diagram of a master exponentiator device.
Figure 12:
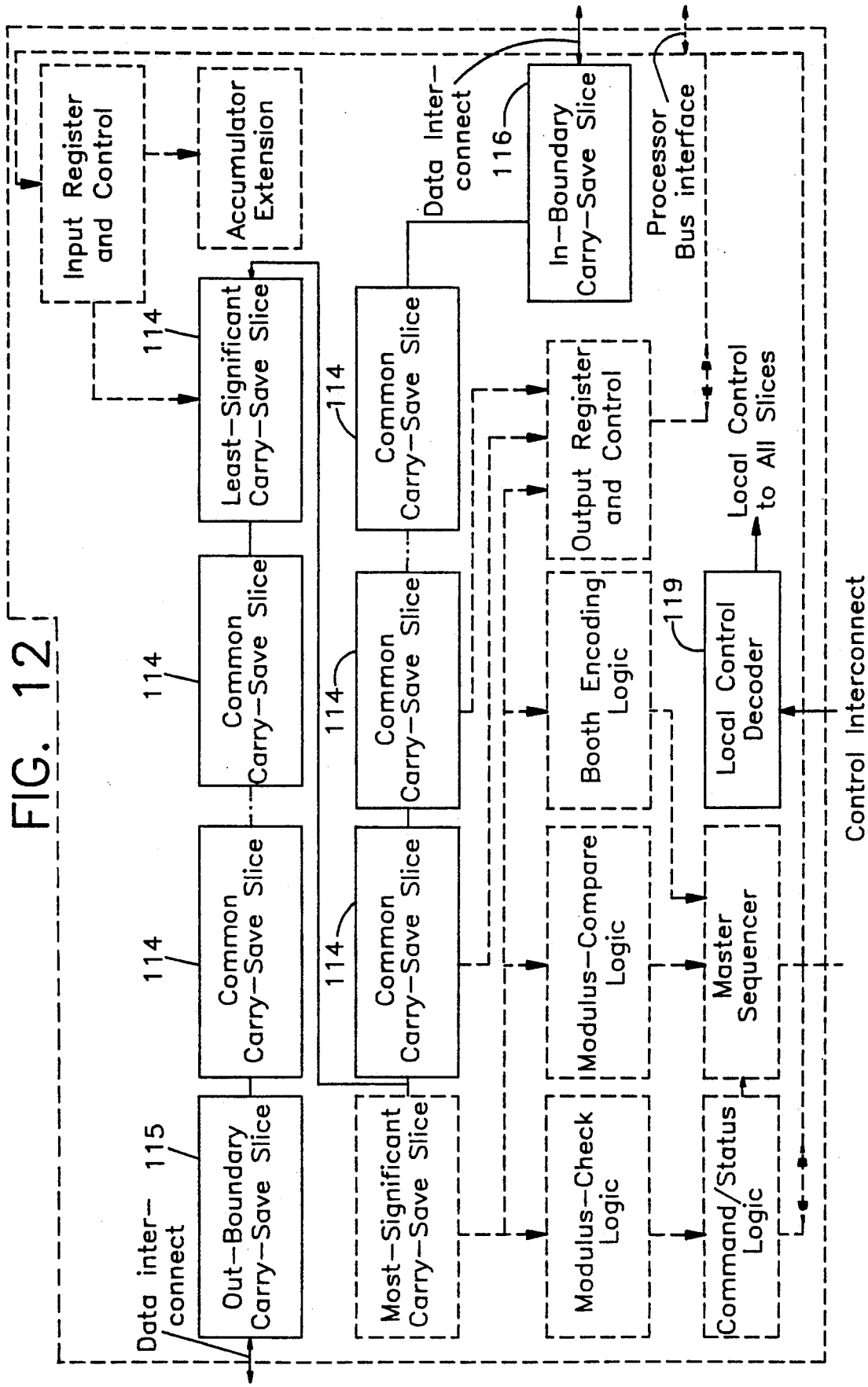
FIG. 12 is a schematic diagram of a slave exponentiator device.
Figure 13:
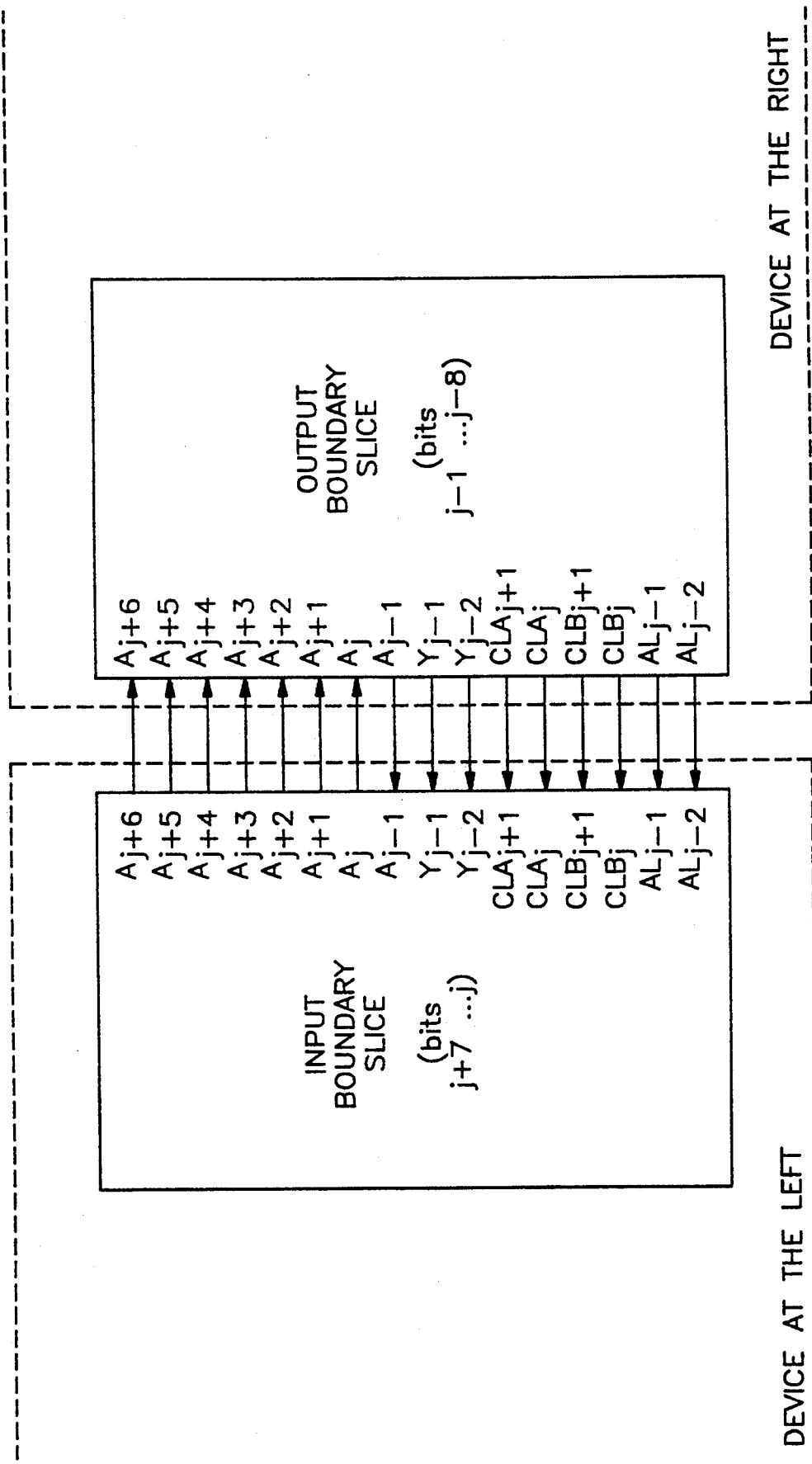
FIG. 13 is a schematic diagram of device boundary interconnections.

With reference to FIGS. 11-13, a string of carry-save slices is used to make most of one device, and a string of (master and slave) devices may be cascaded to make a complete system. A configuration of D cascaded devices can compute the required functions with unsigned integers up to L * D bits long, where L is the arithmetic length of one device. A few special circuits are described to complete the arithmetic logic. Also described, with reference to FIGS. 14-20, are the data flows and timings, input/output logic, and command and control logic.

In the preferred arrangement (described in greater detail herein) one of the devices is configured as a master device, and the others are configured as slave devices. The master device controls the slave devices and provides a bus interface that can operate in 8-, 16-, or 32-bit mode. The bus interface allows a processor to provide commands and data to the devices and to retrieve the results of the computations. The inputs B (base), E (exponent), and M (modulus) are unsigned integers. However, the algorithms permit, and sometimes require, intermediate data to be signed integers, so that the arithmetic circuits described herein are configured for signed binary arithmetic.

MODULO-EXPONENTIATION ALGORITHM

In FIG. 2, a basic algorithm in accordance with the present invention is shown for performing the modulo exponentiation computation of the encryption process, as indicated at block 21. A complementary algorithm is applicable for the decryption process. For the computation of the function $C=B^E$ (Modulo M), a first algorithm component, at block 22, represents the modulo exponentiation function, given base data B, exponent E, and modulus M, as a series of modulus multiplication steps. Each of the modulo multiplication steps are performed, as indicated at block 23, through a series of simpler addition, multiplication, and modulo operations steps. A final result is accumulated in register A.

Turning first to the modulo exponentiation function, the algorithm for computation of $C=B^E$ (Modulo M) is similar to the well-known algorithm for computing $C=B^E$, except that modulo multiplication is included. The exponent E is represented in binary notation, for example, a four-bit exponent is represented by the bits e3, e2, e1, e0, that is, $E=8*e3+4*e2+2*e1+1*e0$. The following illustrates this example using the well-known reduction of the exponentiation function to a series of multiplication steps r(i) corresponding to each exponents bit e(i) (the term (exp) is used to indicate the exponential function):

```
r1 = b(exp)e3
r2 = r1(exp)2 * b(exp)e2 = b(exp)(2*e3 + 1*e2)
r3 = r2(exp)2 * b(exp)e1 = b(exp)(4*e3 + 2*e2 + 1*e1)
r4 = r3(exp)2 * b(exp)e0 = b(exp)(8*e3 + 4*e2 + 2*e1 + 1*e0)
                        = B(exp)E
```

If the bits e3=0 and e2=1, then the exponent E would be a three-bit integer. Then the first step becomes r1=1 and the second step becomes r2=b, which are trivial. If E is a four-bit integer, that is, e3=1, then the first step is r1=b, and this step can be implemented by initialing a register R: b—>R. The second step is r2=r1(exp)2 when e2=0 and r2=r1(exp)2 * b when e2=1. The second step can be implemented, after initialing registers R and B, as "first, R * R—>R, then if e2=1, do R * B—>R. Following a similar reasoning for the remaining steps, the algorithm for the exponential function stated in terms of register operations becomes:

| b      | —>     | R         |
| b      | —>     | B         |
| R * R  | —>     | R         |
| R * B  | —>     | R if e2 = 1 |
| R * R  | —>     | R         |
| R * B  | —>     | R if e1 = 1 |
| R * R  | —>     | R         |
| R * B  | —>     | R if e0 = 1 |
| R —>   | result |           |

Applying the modulo function to the result $B^E$ of the exponentiation computation is a relatively simple task of taking the smallest remainder of $B^E$ divided repeatedly by the modulus M. However, the result of $B^E$ with four-bit b and e values is a 64-bit integer, and for five-bit b and e values, the result is a 160-bit integer. The size of the exponentiation result more than doubles for each additional bit of the input operand size (for only a 32-bit input, a 137 billion-bit output!). Yet, the modulo result of $B^E$ using an N-bit modulus M is only N bits.

The bit-lengths of numbers computed during the computation process can be kept limited by performing the modulo operation with each of the series of multiplications in the exponentiation. This is described in more detail, for example, in U.S. Pat. No. 4,658,094 issued to James M. Clark. The distribution of the modulo function over each multiplication is referred to herein as "modulo multiplication". Since the result of each modulo multiplication is of the same bit-length as the modulus, the size of the intermediate data is kept nearly the same as the size of the modulus during the calculation.

The algorithm for computing $C=B^E(\text{Modulo } M)$ can thus be represented as operations in registers R, B, and M as follows (for the example of a 4-bit exponent):

| b      | —>     | R         |
|--------|--------|-----------|

-continued

| b              | —>    | B            |
| m              | —>    | M            |
| (R * R)(Modulo M) | —> | R            |
| (R * B)(Modulo M) | —> | R if e2 = 1  |
| (R * R)(Modulo M) | —> | R            |
| (R * B)(Modulo M) | —> | R if e1 = 1  |
| (R * R)(Modulo M) | —> | R            |
| (R * B)(Modulo M) | —> | R if e0 = 1  |
| R —> result    |       |              |

The operands of each modulo multiplication operation depend upon the exponent bit e(i). The operation, in the form $P=(X * Y)(\text{Modulo } M)$, can be implemented for e(i)=1 or 0 using registers X, Y, M, and A. The registers are loaded with the respective values x, y, and m prior to the computation. Two X registers named XB and XR are used, and the computation is performed with either X register depending upon the exponent bit. The set of register operations is given as follows (for the example of a 4-bit exponent):

| 128 * ((XR * Y)(Modulo M)) | —> | A, (0 —> Y) |
| 128 * ((XB * Y)(Modulo M)) | —> | A, (0 —> Y) |
| 128 * input                | —> | A           |
| A/128                      | —> | M           |
| A/128                      | —> | XB          |
| A/128                      | —> | XR          |
| A/128                      | —> | Y           |
| A/128 —> output            |    |             |

When the computation is completed, register A stores 128 * P, but the result can be shifted right by seven bits (divided by 128) when transferring the contents of A to other registers. The computation clears the Y register but preserves the contents of the X and M registers.

The set of register operations can now be written as a loop computation for the respective bits of the exponent by the following sequence of steps, wherein the Pascal "for" and "if" syntax is used to define the sequencing logic, and n is the number of exponent bits:

```
128 * m      —>   A
A/128        —>   M
128 * b      —>   A
A/128        —>   XB
A/128        —>   XR
A/128        —>   Y
for i := n−2 downto 0, do begin
    128 * ((XR * Y)(Modulo M))   —>   A, (0 —> Y)
    A/128                        —>   XR
    A/128                        —>   Y
    if (e(i) = 1) then begin
        128 * ((XB * Y)(Modulo M))   —>   A, (0 —> Y)
        A/128                        —>   XR
        A/128                        —>   Y
    end;
end;
A/128 —> result
```

The hardware used to implement this sequence need not have a register for the entire exponent. Instead, the exponent may be loaded during the exponentiation computation next-to-most-significant bit first, and the exponent bits are used as they are loaded. The asynchronous interface uses full/empty status flags to coordinate the rate of data transfer for the exponent data as well as for all other I/O transfers. The final result of the register operations is transferred to register A as follows:

$$128 * ((XR * Y)(\text{Modulo } M)) \rightarrow A, (0 \rightarrow Y)$$

$$128 * ((XB * Y)(\text{Modulo } M)) \rightarrow A, (0 \rightarrow Y)$$

In accordance with the innovative algorithm of the present invention, each of the modulo multiplications is performed as a series of simpler addition, multiplication, and modulo operations. The computation of $P = (X * Y)(\text{Modulo } M)$ can be performed in a similar manner as the algorithm for computing the product $P = X * Y$. The X and Y variables are represented in signed binary (two's-complement) notation. For this notation, the most-significant bit (sign bit) has negative weight. Take as an example a six-bit number Y represented by the bits y5, y4, y3, y2, y1, y0:

$$y = -32*y5 + 16*y4 + 8*y3 + 4*y2 + 2*y1 \; 1*y0$$

Next, an extended form of the well-known Booth algorithm is used, where the representation of the y factor is partitioned into overlapping groups of three bits as follows:

$$y = -32*y5 + 16*y4 + 16*y3 +$$
$$-8*y3 + 4*y2 + 4*y1 +$$
$$-2*y1 + 1*y0 + 1*(0)$$

Some bits, such as y3, belong to two groups and are assigned two different weights (16 and −8 for y3), but the sum of the weights is the same as the original weight. A dummy zero bit is added to complete the last group, but this bit does not introduce any error. The weights for each group are a power of four times the set −2, 1, 1, as tabulated here:

| −32 | 16 | 16: | = 4(exp)2 | times: | −2 | 1 | 1 |
| −8  | 4  | 4:  | = 4(exp)1 | times: | −2 | 1 | 1 |
| −2  | 1  | 1:  | = 4(exp)0 | times: | −2 | 1 | 1 |

Thus, the representation of the y factor can be rewritten as:

$$y = 16 * (-2*y5 + 1*y4 + 1*y3) +$$
$$4 * (-2*y3 + 1*y2 + 1*y1)$$
$$1 * (-2*y1 + 1*y0 + 1*(0)).$$

or $$y = 16*xf2 + 4*xf1 + 1*xf0$$

where $$xf2 = -2*y5 + 1*y4 + 1*y3$$

$$xf1 = -2*y3 + 1*y2 + 1*y1$$

$$xf0 = -2*y1 + 1*y0 + 1*(0).$$

Each of the "x-factors" such as xf1 is determined by a group of three bits of Y, as indicated by the following table:

| $y^3$ | $y^2$ | $y^1$ | xf1 |
|---|---|---|---|
| 1 | 0 | 0 | −2 |
| 1 | 0 | 1 | −1 |
| 1 | 1 | 0 | −1 |

-continued

| $y^3$ | $y^2$ | $y^1$ | xf1 |
|---|---|---|---|
| 1 | 1 | 1 | 0 |
| 0 | 0 | 0 | 0 |
| 0 | 0 | 1 | 1 |
| 0 | 1 | 0 | 1 |
| 0 | 1 | 1 | 2 |

This table can be applied to any of the groups by changing only the column headings.

The multiplication algorithm for X * Y using the extended Booth algorithm is illustrated in block 23 of FIG. 2 and will now be described. First, registers X, Y, and A are initialized as follows:

$$x \rightarrow X, y \rightarrow Y, 0 \rightarrow A$$

In the first step, the three most significant bits (MSB) of Y are examined (bits y5, y4, y3 in the example), and the value of xf2 is determined. Then the accumulator register A is shifted to the left by two bits (that is A multiplied by four) and xf2 times X is added to the accumulator A:

$$4*A + xf2*X \rightarrow A \text{ (now } A = xf2*X\text{)}$$

The Y register is also shifted two bits to the left, discarding bits y5 and y4 on the right and shifting in two zeros on the right. The contents of Y are now:

$$y3 \; y2 \; y1 \; y0 \; 0 \; 0$$

In the second step, the three most significant bits of Y are examined (now y3, y2, y1), and the value of xf1 is determined. Again, the accumulator register A is shifted to the left by two bits and xf1 times X is added to A:

$$4*A + xf1*X \rightarrow A \text{ (now } A = 4*xf2*X + xf1*X\text{)}$$

The Y register is again shifted two bits to the left, discarding bits y3 and y2 on the right and shifting in two more zeros on the right. The contents of Y are now:

$$y1 \; y0 \; 0 \; 0 \; 0 \; 0$$

In the third step, the three most significant bits of Y are examined (now y1, y0, 0), and the value of xf0 is determined. Again, the accumulator register A is shifted to the left by two bits and xf0 times X is added to A:

$$4*A + xf0*X \rightarrow A \text{ (now}$$
$$A = 16*xf2*X + 4*xf1*X + xf0*X)$$

The Y register is again shifted two bits to the left, discarding bits y1 and y0 on the right and shifting in two more zeros on the right. (This is done to minimize the complexity of the algorithm.) The contents of register Y are now all zeros. Register A is now equal to $(16*xf2 + 4*xf1 + xf0) * X$, which equals $X * Y$. This example is not representative of the case where the length of the Y register is odd, since the Y register is shifted two bits at each step. The odd-length case is discussed further below.

The following now explains how an x-factor (xf) times X is added to the accumulator. If xf = 1, then $xf*X = X$, so we add X. That is, at each bit position i of the adder, we select x(i) (the ith bit of X) as an adder input. If xf = −1, then $xf*X = -X$, so we add −X (the same as subtracting X). In two's-complement notation, $-X$ is obtained by adding one to the one's complement (logical 'not' of all bits). Thus, at each bit position i of the adder, we select $\sim x(i)$ (logical not of $x(i)$) as an adder input, and set the carry input of the adder to one (instead of the usual zero).

If $xf=2$, then $xf*X=2*X$, so we add X shifted left by one bit. That is, at each bit position i of the adder, we select $x(i+1)$ as an adder input. If $xf=-2$, then $xf*X=-2*X$, so we add $-X$ shifted left by one bit. That is, at each bit position i of the adder, we select $\sim x(i+1)$ as an adder input, and set the carry input of the adder to one.

If $xf=0$, then $xf*X=0$, so we add zero. That is, at each bit position i of the adder, we select zero as an adder input. We can choose to subtract zero instead. That is, at each bit position of the adder, we select $\sim 0$ (one) as an adder input, and set the carry input of the adder to one.

The table for determining x-factors can be made more symmetrical by changing one of the zeros to minus zero as shown here:

| $y^3$ | $y^2$ | $y^1$ | xf1 |
|---|---|---|---|
| 1 | 0 | 0 | $-2$ |
| 1 | 0 | 1 | $-1$ |
| 1 | 1 | 0 | $-1$ |
| 1 | 1 | 1 | $-0$ |
| 0 | 0 | 0 | 0 |
| 0 | 0 | 1 | 1 |
| 0 | 1 | 0 | 1 |
| 0 | 1 | 1 | 2 |

The interpretation of the modified table is that for Y-bits 1 1 1, we subtract zero as described above, but for Y-bits 0 0 0, we add zero. This simplifies the logic. For example, y3 will specify the carry input directly.

The five possible adder inputs $\sim x(i+1)$, $\sim x(i)$, 0, $x(i)$, and $x(i+1)$ to the bit positions (corresponding to operands $-2*X$, $-X$, 0, X, and $2*X$) can be selected by a four-input multiplexer. In an AND-OR implementation of a multiplexer, each input is ANDed with a select-control, and all AND-outputs are ORed. If none of the four inputs are selected (all select-controls are zero), then the output of the multiplexer is zero.

The following describes the implementation where the length of the Y register is odd. The groups of three weights at the most significant end of Y are aligned as before. (Alternatively, the groups at the least-significant end of Y may be aligned.) Take as an example a five-bit number Y represented by the bits y4, y3, y2, y1, y0:

$$y = -16*y4 + 8*y3 + 4*y2 + 2*y1 + 1*y0$$

$$y = -16*y4 + 8*y3 + 8*y2 +$$
$$\quad -4*y2 + 2*y1 + 2*y0 +$$
$$\quad\quad -1*y0 + 0.5*(0) + 0.5*(0)$$

$$y = 8*(-2*y4 + 1*y3 + 1*y2) +$$
$$\quad 2*(-2*y2 + 1*y1 + 1*y0) +$$
$$\quad\quad 0.5*(-2*y0 + 1*(0) + 1*(0))$$

$$y = 8*xf2 + 2*xf1 + 0.5*xf0$$

where $$xf2 = -2*y4 + 1*y3 + 1*y2$$

$$xf1 = -2*y2 + 1*y1 + 1*y0$$

$$xf0 = -2*y0 + 1*0 + 1*0$$

There are two dummy zero bits to complete the last group, and the last x-factor (xf0) is always even.

The sequence of shift and add register operations can thus proceed as follows:

| | |
|---|---|
| $x \rightarrow X, y \rightarrow Y, 0 \rightarrow A$ | (initialize) |
| y4 y3 y2 y1 y0 | (determine xf2 from y4 y3 y2) |
| $4*A + xf2*X \rightarrow A$ | (now $A = xf2*X$) |
| y2 y1 y0 0 0 | (determine xf1 from y2 y1 y0) |
| $4*A + xf1*X \rightarrow A$ | (now $A=4*xf2*X + xf1*X$) |
| y0 0 0 0 | (determine xf0 from y0 0 0) |
| $4*A + xf0*X \rightarrow A$ | (now $A = 16*xf2*X+4*xf1*X+ xf0*X$) |

Comparing the result to the equation for y, the accumulator now stores $2*X*Y$. The extra factor of two is eliminated by shifting the data when unloading the accumulator.

We have shown how an exponentiation can be computed using a sequence of multiplications, and how the modulo operation can be distributed over each of the multiplications. We have also shown how a multiplication can be done with a sequence of additions, and likewise, the modulo operation can be distributed over each of the additions. Without distributing the modulo operation, multiplication of two N-bit integers would produce a 2*N-bit product, which could be reduced to an N-bit result by an N-bit modulus. But by distributing the modulo operation over each of the additions, the intermediate values are kept from growing more than a few bits longer than N bits. The size of the adder and accumulator registers can thus be kept to N bits.

A more precise definition is now given of the modulo operation. By $R=X(\text{Modulo } M)$ we mean that we divide an integer x by an integer m and take the remainder as the result r. That is, we find a number r such that $x-q*m=r$, where r (remainder) and q (quotient) are integers. However, there are many values of r and q that satisfy the above equation. For example, in the case of $x=69$ and $m=7$ some of the solutions are:

$$69-7*7=20$$

$$69-8*7=13$$

$$69-9*7=6$$

$$69-10*7=-1$$

$$69-11*7=-8$$

$$69-12*7=-15$$

A common way of defining a unique solution is to select the smallest non-negative integer that satisfies the equation. In this case, $0<=r<m-1$. For the above example, we would select the value 6 for the "unsigned modulo" operation.

An alternative is to select the smallest integer (in absolute value) that satisfies the equation. For the above example, the smallest absolute value is $-1$ for the "signed modulo" operation. But for an even-valued modulus such as $M=8$, values of 8 and $-8$ having equal absolute value may occur. If uniqueness is important, we could define the allowable range of r as:

$-m/2 < r < m/2$ for odd $m$ $-m/2 < r <= m/2$ for even $m$

However, for the purposes of handling the intermediate results, uniqueness is unimportant, and the result need only be small enough that it can be processed by a given size of arithmetic logic without danger of overflow. Thus, a "limited modulo" operation is defined as one that produces any integer satisfying the above equation and within some specified limits. It should be understood that if a result is produced according to one of these definitions, it can always be easily converted to satisfy a different one of these definitions by adding or subtracting m until the definition is satisfied.

The modulo algorithm described next implements a "limited modulo" operation. The x, y, or b inputs provided to the hardware must be in the range $-m \ldots m$. The intermediate values during multiplication are in the range $-84.667*m \ldots 84.667*m$, and the final result of a multiplication or exponentiation is in the range $-0.625*m \ldots 0.625*m$. This approximates the "signed modulo" operation, and is used for intermediate multiplication results. To obtain an "unsigned modulo" operation, we only need to add m to any result that is negative. This extra step is taken prior to outputting any multiplication or exponentiation result, so that the external software always sees an "unsigned modulo" result.

Earlier, we described the extended Booth method of multiplication obtained by repeated shift-and-add operations of the form:

$$4*A + xf*X -> A$$

where xf is chosen by inspection of the most significant three bits of the Y register. As indicated in block 23 of FIG. 2, to include a modulo operation in the multiplication cycle, each of the above operations is followed by an add operation of the form:

$$A + mf*M -> A$$

where mf is chosen by inspection of the most-significant eight bits of the A register. A sequence of these operations computes values such as:

$$a2 = 4*a1 + xf1*X + mf1*M$$

$$a3 = 4*a2 + xf2*X + mf2*M$$

$$a4 = 4*a3 + xf3*X + mf3*M$$

where a1, a2, ... are successive values in the accumulator after every two additions. The value of mf1 is determined by inspecting a1, and mf2 by inspecting a2, etc.

To determine mf, the accumulator A is compared to four threshold values of the form tf*M, where tf = -48, -16, 16, and 48 are used. These threshold values partition the range of possible accumulator values into five zones, and the mf value is chosen according to which zone contains the current accumulator value, as given by the following table:

| If ... | | | | : then ... | |
|---|---|---|---|---|---|
| zone 1: | | A | < | -48*M | : mf = 256 |
| zone 2: | -48*M | <= A | < | -16*M | : mf = 128 |

-continued

| If ... | | | | : then ... | |
|---|---|---|---|---|---|
| zone 3: | -16*M | <= A | < | 16*M | : mf = 0 |
| zone 4: | 16*M | <= A | < | 48*M | : mf = -128 |
| zone 5: | 48*M | <= A | | | : mf = -256 |

The mf values are 128 times the xf values of 2, 1, 0, -1, and -2. This means that the methods described earlier for adding xf*X to the accumulator can also be used for adding mf*M to the accumulator. 128*M is used instead of X, and 128*M is obtained by shifting the data from the M register seven bit positions to the left.

The negative mf values are used when A is positive, and vice versa, and the larger mf values are used for zones further from zero. In each case, mf is -4 times the center of the zone. The factor of 4 anticipates that A will be shifted up, and referencing the zone center anticipates that xf*X values span a region $-2*M \ldots 2*M$ that is centered on zero.

A worst-case analysis indicates that this algorithm will keep the accumulator value from growing larger than plus or minus 84.667*M at the end of each computation cycle. This analysis also shows that comparison errors can be allowed up to plus or minus 4.667*M, where the X value is in the range $-M \ldots M$. Thus, at the end of a multiplication cycle, the accumulator stores (2*X*Y) Modulo (128*M), which is in the range $-84.667*M \ldots 84.667*M$.

The range of the final product is further reduced by adding three more computation cycles at the end of the multiplication cycle. These cycles shift up the result and add/subtract more multiples of the modulus. Before these three special cycles begin, the Y register is cleared, so that xf=0 during these cycles. According to the worst-case analysis, the range of A is reduced to $-80*M \ldots 80*M$ when xf=0. These three cycles shift the contents of the accumulator six more bits to the left, leaving the result:

$$-80*M < (128*X*Y) \text{ Modulo } (128*M) < 80*M$$

After shifting the result to the right seven bits, we get:

$$-0.625*M < (X*Y) \text{ Modulo } (M) < 0.625*M$$

This "limited modulo" result is sufficient for intermediate multiplications during an exponentiation calculation, since the intermediate products need only be within the range of -M to M. However, for final outputs to the external software, the modulus is added to any result that is negative, thus providing an "unsigned modulo" operation in these cases. An unsigned result is provided to the software because most application software is structured to operate with unsigned data.

SCALING FOR SMALL INTEGERS (AND REGISTER LENGTHS)

The comparison error allowance means that only several most-significant bits of the accumulator need to be compared, which greatly reduces the hardware. However, another consequence of using an approximate comparison is that data must be scaled up when computing with integers that are so small that an insufficient number of significant bits will fall within the range of the comparison logic.

Integers that are small compared to the size of the hardware registers can be accommodated by appending an even number of zero bits on the right, that is, by multiplying the integers by a power of four. An even number of zeros is required because the extended Booth algorithm shifts and processes bits in the Y register two bits at a time. (Odd lengths can be accommodated by including a single zero on the left.)

The modulus value m is used to define the scale of the integers, because the input data (b, x, or y) is required to be in the range $-m \ldots m$. (Usually, this data will be given in the range $0 \ldots m$, that is, unsigned.) The maximum value of m is determined by the maximum length (number of bits) of m, which is determined by $N = L * D$, where L is the arithmetic length of one device, and D is the number of cascaded devices. Thus, the maximum value of m that the hardware can handle is $2^N - 1$. If m is smaller than $2^{N-2}$, that is, less than ¼ of the maximum, then the M register must be loaded with the value $m*2^s$, that is, m followed by s zeros, where s is even. The value of s is determined by the limits:

$$2^{N-2} <= m*2^s < 2^N$$

Because x and y are in the range $-m \ldots m$, the X and Y registers are each $N+1$ bits long (a sign bit is included). Since N is even, these registers have an odd length; this is why the multiplication algorithm is defined for an odd-length Y register. Because the accumulator values are in the range $-84.667*M \ldots 84.667*M$, and M can be as large as $2^N - 1$, the accumulator register A is $N+8$ bits long. Its sign bit has a weight of $-2^{N+7}$, or $-128$ times the maximum value of M.

To compute $(X * Y)(\text{Modulo } M)$, the X, Y, and M registers are all scaled up by s bits, that is, $X = x*2^s$, $Y = y*2^s$, and $M = m*2^s$. In the X and Y registers, the length of the actual x and y data proceeding the s zeros is $N+1-s$ (an odd number, for each register). The multiplication cycle needs $(N+2-s)/2$ compute cycles to examine all of the actual data in the Y register, shifting the accumulator $N+2-s$ bits. The result is:

$$A = (2 * X * Y / 2^S) \text{ Modulo } (128 * M)$$
$$= (2 * x*2s * y*2^S / 2^S) \text{ Modulo } (128 * m*2^S)$$
$$= (2 * x * y * 2^S) \text{ Modulo } (128 * m * 2^S)$$

The X and Y values are divided by $2^s$ here because the accumulator is shifted s bits less than for unscaled data. The three special cycles then shift the results six more bit positions, so that:

$$A = (128 * x * y * 2^s) \text{ Modulo } (128 * m * 2^s),$$

or $$A/128 = (x * y \text{ Modulo } m) * 2^s$$

If the results are transferred to register Y, for example, $A/128 \rightarrow Y$, then $Y = (x*y \text{ Modulo } m)*2^s$, so that the scaling of the data is preserved. Therefore, the exponentiation algorithm, which uses the multiplication cycles and register transfers as described here, will also operate properly with this method of data scaling.

To illustrate the scaling, an example will now be shown of the extended Booth algorithm where five-bit factors are scaled to fit seven-bit registers. The sequence of shift and add operations (without showing the modulo operations) proceeds as follows:

| | | |
|---|---|---|
| x4 x3 x2 x1 x0 0 0 | $\rightarrow$ X | (4*x $\rightarrow$ X) |
| y4 y3 y2 y1 y0 0 0 | $\rightarrow$ Y | (4*y $\rightarrow$ Y) |
| 0 0 0 0 0 0 0 | $\rightarrow$ A | |
| y4 y3 y2 y1 y0 0 0 | | (determine xf2 from y4 y3 y2) |
| 4*A + xf2*X $\rightarrow$ A | | (now A = 4*xf2*X) |
| y2 y1 y0 0 0 0 0 | | (determine xf1 from y2 y1 y0) |
| 4*A + xf1*X $\rightarrow$ A | | (now A = 16*xf2*X + 4*xf1*X) |
| y0 0 0 0 0 0 0 | | (determine xf0 from y0 0 0) |
| 4*A + xf0*X $\rightarrow$ A | | (now A = 64*xf2*X + 16*xf1*X + 4*xf0*X) |
| | | = 8*x*(8*xf2 + 2*xf1 + 0.5*xf0) |

Comparing the result to the equation for $y = 8*xf2 + 2*xf1 + 0.5*xf0$, we see that the accumulator now stores 8*x*y. The three special cycles thus multiply the result by 64, so that A=512*x*y. Then the result is divided by 128 when transferring to another register, for example, Y=4*x*y, so the scale factor is the same as before.

COMPARISON LOGIC

In the previous section, we indicated that the accumulator A is compared to four thresholds, which are multiples of the modulus M, and that an error of up to plus or minus 4.667*M is allowed in making these comparisons. Here, we describe how the comparisons are done.

Each threshold tf*M is subtracted from the accumulator A. (This can be also described as adding the two's complement of tf*M to A.) If the result is negative, that is, A-tf*M<0, then A<tf*M, that is, the accumulator value is below the threshold. A negative result is indicated by the sign bit alone, and that part of the subtractor (adder) is provided for the sign bit. The threshold values are $-48*M$, $-16*M$, $16*M$, and $48*M$. These are implemented as follows:

For threshold $-16*M$, we add 16*M to A, obtaining 16*M by shifting M four bits to the left; that is, bit $i-4$ of M is aligned with each bit i of A. For threshold 16*M, we add $-16*M$ to A, obtaining $-16*M$ by shifting not$-M$ four bits to the left; that is bit $i-4$ of not$-M$ is aligned with each bit i of A. For a precise comparison, we would also need to change the carry input to bit position zero to a one, but that bit position is far below the range of the comparator. Ignoring this detail is the smallest component of the comparison error (truncation of the comparator is discussed below).

For threshold $-48*M$, we add 48*M to A, obtaining 48*M by adding 16*M and 32*M. The 32*M is obtained by shifting M five bits to the left; that is, bit $i-5$ of M is aligned with each bit $i-4$ of M and added to get bit i of 48*M. For threshold 48*M, we add $-48*M$ to A, obtaining $-48*M$ (approximately) by taking the logical 'not' of 48*M.

An error analysis indicates that sufficient accuracy can be obtained by adding truncated operands as follows. For consistency, the tables below show the bit positions corresponding to the most-significant 11 bits of the accumulator (bits $N+7 \ldots N-3$), even though not all of the bit positions are used in every case. Where some bit positions are not used, the tables include zero bits or sign-extension, as appropriate.

First, we add these:

| | | | | | | | | | | |
|---|---|---|---|---|---|---|---|---|---|---|
| | | | | | | | | | | 1 |
| 0 | 0 | 0 | 0 | $M_{N-1}$ | $M_{N-2}$ | $M_{N-3}$ | $M_{N-4}$ | $M_{N-5}$ | $M_{N-6}$ | $M_{N-7}$ |
| 0 | 0 | 0 | $M_{N-1}$ | $M_{N-2}$ | $M_{N-3}$ | $M_{N-4}$ | $M_{N-5}$ | $M_{N-6}$ | $M_{N-7}$ | $M_{N-8}$ | to obtain an approximation of the sum $S = 16*M + 32*M$:

| | | | | | | | | | |
|---|---|---|---|---|---|---|---|---|---|
| 0 | 0 | $S_{N+5}$ | $S_{N+4}$ | $S_{N+3}$ | $S_{N+2}$ | $S_{N+1}$ | $S_N$ | $S_{N-1}$ | $S_{N-2}$ $S_{N-3}$ |

The zeros shown on the left indicate implied sign bits for these positive values. Truncating each input to this addition introduces negative error in the range $-2^{(N-3)} + 1, \ldots 0$ for each input. The single 'one' bit shown on the top line is also added into bit position $N-3$ of the sum S. This bit is easily included as a 'carry' input to the adder, and is used to introduce a fixed positive error of $2^{(N-3)}$ to cancel some of the negative error. Bits $N-1 \ldots N-3$ of this sum are not used by the comparators. This truncation causes an additional error in the range $-2^N + 2^{(N-3)} \ldots 0$. The total error of the truncated sum S is:

| | | | |
|---|---|---|---|
| $2^{(N-3)}$ | ... | $2^{(N-3)}$ | (fixed error) |
| $-2^{(N-3)} + 1$ | ... | 0 | (for 16*M truncation) |
| $-2^{(N-3)} + 1$ | ... | 0 | (for 32*M truncation) |
| $-2^N + 2^{(N-3)}$ | ... | 0 | (for sum S truncation) |
| $-2^N + 2$ | ... | $2^{(N-3)}$ | (for S as used |

We now list the comparator inputs, where each of the four comparators is viewed as a signed adder that produces only a sign bit for output. For each 'adder', one input is the truncated accumulator and the other input is an approximation of the negation of the associated threshold value. The accumulator input to each of the four comparators is:

| | | | | | | | | | | |
|---|---|---|---|---|---|---|---|---|---|---|
| $A_{N+7}$ | $A_{N+6}$ | $A_{N+5}$ | $A_{N+4}$ | $A_{N+3}$ | $A_{N+2}$ | $A_{N+1}$ | $A_N$ | 0 | 0 | 0 |

Truncating the accumulator data introduces an error in the range of $-2^N - 2^{(N-6)} \ldots 0$. A single 'one' bit is also added into bit position N of each comparator. This bit is easily included as a 'carry' input to the comparator, and is used to introduce a fixed positive error of $2^N$ to cancel some of the negative error.

The comparator inputs for the $-48*M$ threshold are:

| | | | | | | | | | | |
|---|---|---|---|---|---|---|---|---|---|---|
| | | | | | | | 1 | | | |
| $A_{N+7}$ | $A_{N+6}$ | $A_{N+5}$ | $A_{N+4}$ | $A_{N+3}$ | $A_{N+2}$ | $A_{N+1}$ | $A_N$ | 0 | 0 | 0 |
| 0 | 0 | $S_{N+5}$ | $S_{N+4}$ | $S_{N+3}$ | $S_{N+2}$ | $S_{N+1}$ | $S_N$ | 0 | 0 | 0 |

The comparator inputs for the 48*M threshold are:

| | | | | | | | | | | |
|---|---|---|---|---|---|---|---|---|---|---|
| | | | | | | | 1 | | | |
| $A_{N+7}$ | $A_{N+6}$ | $A_{N+5}$ | $A_{N+4}$ | $A_{N+3}$ | $A_{N+2}$ | $A_{N+1}$ | $A_N$ | 0 | 0 | 0 |
| 1 | 1 | $\sim S_{N+5}$ | $\sim S_{N+4}$ | $\sim S_{N+3}$ | $\sim S_{N+2}$ | $\sim S_{N+1}$ | $\sim S_N$ | 0 | 0 | 0 |

The comparator inputs for the $-16*M$ threshold are:

| | | | | | | | | | | |
|---|---|---|---|---|---|---|---|---|---|---|
| | | | | | | | 1 | | | |
| $A_{N+7}$ | $A_{N+6}$ | $A_{N+5}$ | $A_{N+4}$ | $A_{N+3}$ | $A_{N+2}$ | $A_{N+1}$ | $A_N$ | 0 | 0 | 0 |
| 0 | 0 | 0 | 0 | $M_{N-1}$ | $M_{N-2}$ | $M_{N-3}$ | $M_{N-4}$ | 0 | 0 | 0 |

The comparator inputs for the 16*M threshold are:

| | | | | | | | | | | |
|---|---|---|---|---|---|---|---|---|---|---|
| | | | | | | | 1 | | | |
| $A_{N+7}$ | $A_{N+6}$ | $A_{N+5}$ | $A_{N+4}$ | $A_{N+3}$ | $A_{N+2}$ | $A_{N+1}$ | $A_N$ | 0 | 0 | 0 |
| 1 | 1 | 1 | 1 | $\sim M_{N-1}$ | $\sim M_{N-2}$ | $\sim M_{N-3}$ | $\sim M_{N-4}$ | 0 | 0 | 0 |

For the first two comparators listed, the sum of the error ranges is:

| | | | |
|---|---|---|---|
| $2^N$ | ... | $2^N$ | (fixed error) |
| $-2^N - 2^{(N-6)}$ | ... | 0 | (for A) |
| $-2^N + 2$ | ... | $2^{(N-3)}$ | (for S = 48*M) |
| $-2N - 2(N-6) + 2$ | ... | $2N + 2(N-3)$ | (total error) |

For the last two comparators listed, the sum of the error ranges is:

| | | | |
|---|---|---|---|
| $2^N$ | ... | $2^N$ | (fixed error) |
| $-2^N - 2^{(N-6)}$ | ... | 0 | (for A) |
| $-2^N$ | ... | 0 | (for S = 16*M) |
| $-2^N - 2^{(N-6)}$ | ... | $2^N$ | (total error) |

As stated earlier, comparison errors of up to plus or minus 4.667*M are allowed. For the worst case, M can be no smaller than $2^{(N-2)}$ when the data is properly scaled, making the error allowance plus or minus 4.667*2^(N-2), or the range of −1.167*2^N ... 1.167*2^N. But the worst actual error is −1.016*2^N ... 1.125*2^N.

ADDITION OF VERY LARGE INTEGERS

In this section, we describe the methods used to do the additions of very large integers required by the multiplication and modulo algorithms, namely:

4*A+xf*X−>A (one step of multiplication)

A+mf*M−>A (one step of modulo)

Special consideration of carry propagation is needed when adding integers that are hundreds or thousands of bits long. There are three basic methods of carry propagation that can be used: carry-ripple, carry-save, and carry-look-ahead. These basic methods can be combined in various ways. These methods are briefly defined below.

The carry-ripple method connects the carry-out from one bit position of the adder to the carry-in of the next (more significant) bit position. Used alone, this method would require the clock period to exceed N ripple (carry-in to carry-out) delays for an N-bit adder, plus smaller delays for selecting the operands, etc.

The carry-save method puts the carry-out data into a carry register at the same time that the "sum" data is put into an accumulator register. Now the clock period can be independent of the operand size, including only a few adder and multiplexer delays. However, the true sum is not really completed in this clock cycle. The true sum is the sum of the data in the carry and accumulator registers. Therefore, to do an addition of the form sum (new)=sum (old)+f where f is a selected multiple of X or M, we actually do:

acc (new)+carry (new)=acc (old)+carry (old)+f

That is, the carry bits are not propagated immediately, but are saved and included in the next addition. Each addition cycle partially propagates the carries, but also generates more carries. When we are done adding selected 'f' data to the accumulator and carry registers, we then need to add the carry data and accumulator data to obtain the true sum as a single integer. We accomplish this with "flush" cycles of the form:

acc (new)+carry (new)=acc (old)+carry (old)+0

In the first flush cycle, the least-significant bit of the carry-save register propagates into more significant bit positions of the accumulator and carry-save registers, and becomes zero because there are no carries generated to go into this bit position. On each successive flush cycle, a similar argument shows that more and more carry-save bits become zero. At any cycle, the true sum is the sum of the data in the carry and accumulator registers. But when all of the carry bits become zero, it is clear that the true sum is represented entirely by the accumulator register alone. The number of flush cycles needed can be determined either by checking that all carry bits are zero, or by counting the flush cycles. A number of flush cycles equal to the number of carry-save stages is always sufficient, and extra flush cycles preserve the result.

For the carry-look-ahead method, the bit positions of the adder are grouped into consecutive blocks of a few bits each, and these blocks are grouped into larger blocks, etc., until the entire adder is defined as the largest block, thus forming a hierarchal tree structure. At any level (of the tree, or of block size), each block includes logic to produce a "carry-generate" signal and a "carry-propagate" signal to its larger "parent" block, using similar signals from each of its smaller "child" blocks. Also, at any level, each block includes logic to produce carry-in signals to each of its "child" blocks, using the carry-generate and carry-propagate signals from its "child" blocks and the carry-in signal from its "parent" block.

At the lowest level (smallest blocks) are ordinary adders modified to also produce carry-generate and carry-propagate outputs, and these use carry inputs from the higher levels. At the highest level (the entire adder), the carry-generate and carry-propagate outputs are not needed, and the carry input is simply the carry input for the entire adder.

The carry-look-ahead method continually maintains a complete sum, and the time to propagate carries is roughly proportional to the logarithm of the data length. However, this method is more complex, both because of the need for additional logic, and also because of the disparity of the tree structure of the look-ahead logic and the linear structure of the basic logic and registers. Therefore, in the preferred embodiment, the selected method is a combination of the ripple-carry and carry-save methods that approaches the speed of the carry-look-ahead method with much simpler logic.

SLICE PARTITIONING

In the preferred embodiment of the present invention shown in FIG. 3, the adder is partitioned into "carry-save slices" of eight bit positions per slice. In one clock cycle, each slice adds eight adjacent bits of each of the selected operands, and produces eight sum bits that are clocked into the accumulator at the end of the clock cycle. Each adder slice also has inputs from a carry-save register and outputs that are clocked into the carry-save register at the end of the clock cycle. The terms "carry-save slice" or "slice" are used herein to mean not only a slice of the adder, but also a slice of the multiplexers that select the inputs to the adder, and an eight-bit slice of each of the registers, choosing that portion of each register that is most closely coupled to the adder slice. These slices account for more than 90 percent of the gates of the preferred exponentiator device. The remainder is I/O and control logic.

The most-significant and least-significant slices are slightly different than the others, and for efficient connection of cascaded devices, the slices adjacent to the chip interface (or chip "boundary") are also slightly different. For the common slice that is used in most slice positions, we will first describe how addition operates when not shifting, as in the modulo step A+mf*M-−>A. Then we will describe how addition operates when we are simultaneously shifting the accumulator, as in the multiplication step 4*A+xf*X−>A.

ADDITION WITHOUT SHIFTING

In the common slice, there is no sign bit (that is, all bits have positive weight, even when the operands are complemented), so that each 8-bit slice of an operand appears as an unsigned integer. The largest value of each operand slice (interpreted as an unsigned integer) is 255, so that the sum may be as large as 510. Shown in binary notation, this is:

| relative bit position: | 8 7 6 5 4 3 2 1 0 | |
|---|---|---|
| A operand: | 1 1 1 1 1 1 1 1 | (max value) |
| mf*M operand: | 1 1 1 1 1 1 1 1 | (max value) |
| A +mf*M sum: | 1 1 1 1 1 1 1 1 0 | (max value) |

The sum here is one bit longer than either operand. Thus, the 9-bit sums produced by the 8-bit slices overlap by one bit, as pictured here:

```
...18 17 16 15 14 13 12 11 10 9 8 7 6 5 4 3 2 1 0
                              1 1 1 1 1 1 1 1 0
              1 1 1 1 1 1 1 1 0
    ... 1 1 0
```

Bit 8 of the sum is called the carry bit; it is in the same bit position as bit 0 of the next-more-significant slice (to the immediate left). The carry bit is clocked into a "carry-save" flip-flop, and bits 7 . . . 0 of the sum are clocked into the accumulator register. Thus, the accumulator register A and carry-save register C are sliced as follows:

```
...18 17 16. 15 14 13 12 11 10 9 8. 7 6 5 4 3 2 1 0
    A A A.  A A A A A A A A.  A A A A A A A A
        .C                         .C
```

The carry-save register, which holds part of the sum, must be included in each addition cycle to add the complete sum. Revising the case of maximum values gives:

| relative bit position: | | 8 7 6 5 4 3 2 1 0 | |
|---|---|---|---|
| | / | 1 | (max carry) |
| A operand: | | 1 1 1 1 1 1 1 1 | (max value) |
| mf*M operand: | | 1 1 1 1 1 1 1 1 | (max value) |
| A + mf*M sum: | | 1 1 1 1 1 1 1 1 | (max value) |

However, we will show in the next section that a shifting cycle produces a two-bit carry with a maximum value of 10 (binary). Because a non-shifting cycle typically follows a shifting cycle, the case of maximum values when not shifting is actually as follows:

| relative bit position: | 9 | 8 7 6 5 4 3 2 1 0 | |
|---|---|---|---|
| | / | 1 0 | (max carry) |
| A operand: | | 1 1 1 1 1 1 1 1 | (max value) |
| mf*M operand: | | 1 1 1 1 1 1 1 1 | (max value) |
| A + mf*M sum: | 1 | 0 0 0 0 0 0 0 0 | (max value) |

CARRY-FLUSH ADDITION CYCLE

To "flush" the carries into the accumulator, we use a non-shifting addition cycle where one of the operands is zero. The maximum values for this case are:

| relative bit position: | 9 | 8 7 6 5 4 3 2 1 0 | |
|---|---|---|---|
| | / | 1 0 | (max carry) |
| A operand: | | 1 1 1 1 1 1 1 1 | (max value) |
| zero operand: | | 0 0 0 0 0 0 0 0 | (max value) |
| A + mf*M sum: | 0 | 1 0 0 0 0 0 0 0 1 | (max value) |

When the carry input is zero is zero in a flush cycle, the carry output is always zero, and the accumulator remains unchanged:

| relative bit position: | 9 | 8 7 6 5 4 3 2 1 0 | |
|---|---|---|---|
| | / | 0 0 | (carry) |
| A operand: | | a b c d e f g h | (any value) |
| zero operand: | | 0 0 0 0 0 0 0 0 | |
| new sum A: | 0 | 0 a b c d e f g h | (same value) |

Thus, for any accumulator value, zero carry will propagate to the left one slice per flush cycle until all carry-save bits are zero. Therefore, we never need more flush cycles than the number of slices. However, in most cases, the accumulator slice value will be less than 254, so that even with maximum carry input (2), the sum will be less than 256, that is, there will be zero carry output. Therefore, flushing will usually be completed in much less time than the worst case.

Allowing enough flush cycles for the worst case adds about 25 per cent to the time required for each multiplication. After the last multiplication of an exponentiation, there is a 50 per cent probability that the result will be negative, requiring M to be added to obtain an unsigned output. After this final addition, more flush cycles are needed; but since these are not needed for every multiplication, the additional time is less than one per cent for typical data lengths.

The 25 per cent additional time for flushing can be significantly reduced if logic is added to detect when all carry-save bits are zero. The detection logic needs to examine only half of the carry-save bits, because the most-significant carry-save bit of each carry-save slice is always zero after flushing has started. With this additional logic, flushing can be terminated when the detection logic indicates that flushing is done. This would reduce the average flushing time for typical data lengths to less than three per cent.

ADDITION WITH SHIFTING

When the sum is shifted two bit positions to the left, accumulator bits from relative positions 5, . . . , −2 are added in positions 7, . . . , 0 of the adder, and the carry-save bit from the next-less-significant slice (from relative bit position 0) is added in position 2 of the adder. Thus, the case of maximum values when shifting is as follows:

| relative bit position: | 9 | 8 7 6 5 4 3 2 1 0 | |
|---|---|---|---|
| | / | 1 | (max carry) |
| 4*A operand: | | 1 1 1 1 1 1 1 1 | (max value) |
| xf*X operand: | | 1 1 1 1 1 1 1 1 | (max value) |
| 4*A + xf*X sum: | 1 | 0 0 0 0 0 0 0 1 0 | (max value) |

Now the sum is ten bits long. Bits 9 and 8 of the sum are called carry bits, and are clocked into the carry-save register. Bits 7 . . . 0 are clocked into the accumulator, as before. Thus, the accumulator register A and carry-save register C are sliced as follows:

```
... 18 17 16. 15 14 13 12 11 10 9 8. 7 6 5 4 3 2 1 0
    A A A. A A A A A A A A. A A A A A A A A
    . . . . . .              . . . . . .
    . C C                    . C C
```

The carry now has a maximum value of 10 (binary), so the case of maximum values (when shifting) is revised as follows:

```
relative
bit position:      9  8 7 6 5 4 3 2 1 0
              /       1 0              (max carry)
4*A operand:          1 1 1 1 1 1 1 1  (max value)
xf*X operand:         1 1 1 1 1 1 1 1  (max value)
4*A + xf*X sum:   1   0 0 0 0 0 1 1 0  (max value)
```

LOADING/UNLOADING CYCLE

A shifting cycle is also used to load new data into the accumulator, and to unload the result of a computation from the accumulator. A zero operand is selected so that nothing is added to the accumulator:

```
relative
bit position:      9 8 7 6 5 4 3 2 1 0
              /        0 0             (carry)
4*A operand:           a b c d e f g h (shifted input)
zero operand:          0 0 0 0 0 0 0 0
new sum A:             0 0 a b c d e f g h (shifted input)
```

The carry input and output are zero when loading/unloading.

LEAST-SIGNIFICANT SLICE

At the least-significant slice, zeros are appended to any operands that are shifted, such as:

```
relative
bit position:    9 8 7 6 5 4 3 2 1 0
X:                   x x x x x x x x
2*X:                 x x x x x x x 0
128*M:               m 0 0 0 0 0 0 0
256*M:               0 0 0 0 0 0 0 0
```

When we subtract any of these operands, we complement (logical NOT) each bit and add one by making the carry input to the least-significant slice a one. In all other cases, the carry input is zero. The maximum values for a non-shifting cycle are:

```
relative
bit position:    9 8 7 6 5 4 3 2 1 0
              /                    1   (max carry)
A operand:           1 1 1 1 1 1 1 1   (max value)
mf*M operand:        1 1 1 1 1 1 1 1   (max value)
A + mf*M sum:      0 1 1 1 1 1 1 1 1   (max value)
```

The maximum value of the mf*M slice can be obtained in the case of mf = −256, because the least-significant eight bits of 256*M are all zeros, which after complementing produce eight ones.

A flush cycle of the least-significant slice always produces zero carry output:

```
relative
bit position:      8 7 6 5 4 3 2 1 0
              /                    0   (carry)
A operand:           a b c d e f g h   (any value)
zero operand:        0 0 0 0 0 0 0 0
A + mf*M sum:      0 0 a b c d e f g h (same value)
```

The maximum values for a shifting cycle of the least-significant slice are:

```
relative
bit position:    9 8 7 6 5 4 3 2 1 0
              /                    1   (max carry)
4*A operand:         1 1 1 1 1 1 0 0   (max value)
xf*X operand:        1 1 1 1 1 1 1 1   (max value)
4*A + xf*X sum:    0 1 1 1 1 1 1 1 1   (max value)
```

When loading, the bits (g and h, below) entering positions 1 and 0 of the least-significant slice of the adder are taken from an input shift register described in a later section. Bits a, b, c, d, e, and f are shifted from positions 5 ... 0 of the accumulator:

```
relative
bit position:    9 8 7 6 5 4 3 2 1 0
              /                    0   (carry)
4*A operand:         a b c d e f g h   (shifted input)
zero operand:        0 0 0 0 0 0 0 0
new sum A:         0 0 a b c d e f g h (shifted input)
```

MOST-SIGNIFICANT SLICE

Bit 7 of the most-significant slice is the sign bit of the accumulator, and has negative weight. Bit 0 of the most-significant slice also is the bit position of the sign bit of the XR, XB, and Y registers, and of the implied (zero) sign bit of the M register. These operands are "sign-extended" (the sign bit is duplicated) as needed to provide sufficient bits for the most-significant slice of the adder. Typical operands are:

```
relative
bit position:    9 8 7 6 5 4 3 2 1 0
X:                   s s s s s s s s
2*X:                 s s s s s s s x
128*M:               0 m m m m m m m
256*M:               m m m m m m m m
```

Here, "s" represents the sign bit of X, and "x" is the next bit of X, and m ... m represent the most-significant 7 or 8 bits of M. These values are complemented when we subtract these operands.

The maximum values for the non-shifting part of a compute cycle, ignoring the effect of the modulo algorithm, would be:

```
relative
bit position:    9 8 7 6 5 4 3 2 1 0
              /                  1 0   (max carry)
A operand:           1 1 1 1 1 1 1 1   (max value)
mf*M operand:        1 1 1 1 1 1 1 1   (max value)
A + mf*M sum:      1 0 0 0 0 0 0 0 0   (max value)
```

However, because the choice of the mf value depends on a recent A value, and tends to cancel any overflow, the actual accumulator value is limited to the range −84.667*M ... 84.667*M, as explained earlier. For the maximum M value (all ones), the maximum values in the most-significant slice of the accumulator are:

| relative bit position: | 9 8 7 6 5 4 3 2 1 0 |
|---|---|
| minimum: | 0 1 0 1 0 1 0 0 |
| maximum: | 1 0 1 0 1 1 0 0 |

Thus, bits 9 and 8 of the sum are not needed. There is no carry output, and carry-save bits are not provided for this slice.

The flush cycle is the same as for the other slices, except that there is no carry output:

| relative bit position: | 9 8 7 6 5 4 3 2 1 0 | |
|---|---|---|
| / | 0 0 | (carry) |
| A operand: | a b c d e f g h | (any value) zero |
| operand: | 0 0 0 0 0 0 0 0 | |
| new sum A: | a b c d e f g h | (same value) |

The maximum values for the shifting part of a compute cycle, ignoring the effect of the modulo algorithm, would be:

| relative bit position: | 9 8 7 6 5 4 3 2 1 0 | |
|---|---|---|
| / | 1 0 | (max carry) |
| 4*A operand: | 1 1 1 1 1 1 1 1 | (max value) |
| xf*X operand: | 1 1 1 1 1 1 1 1 | (max value) |
| 4*A + xf*X sum: | 1 0 0 0 0 0 0 1 1 0 | (max value) |

However, because bits 9 and 8 are not needed in the next (non-shifting) cycle, they are also not needed in this cycle. Bits 7 ... 0 of the 4*A operand are bits 5 ... 0 of this slice of the accumulator and bits 7 ... 6 of the next-less-significant slice. Bits 9 and 8 of the accumulator actually have not been discarded. The modulus-comparison logic, in estimating the approximate value of the accumulator, has represented the equivalent information in the form of an mf value. The mf value is stored in a control register, ready to be used in the next cycle, so that the information is not lost, but represented in another form. As a result, the sum produced in this cycle sometimes appears to have overflowed. Actually, in this cycle, the sum is collectively stored in the accumulator, carry-save, and mf registers.

The loading/unloading cycle is the same as for the other slices, except that there is no carry output:

| relative bit position: | 9 8 7 6 5 4 3 2 1 0 | |
|---|---|---|
| / | 0 0 | (carry) |
| A operand: | a b c d e f g h | (any value) |
| zero operand: | 0 0 0 0 0 0 0 0 | |
| new sum A: | a b c d e f g h | (same value) |

Bit "a" (the sign bit) is zero after loading and before unloading.

ADDING SIGN BITS

At the most-significant bit position, the inputs to the adders, except for carry inputs, have negative weight because these are the sign bits. The operation of the full adders is different in this case. In this discussion, a distinction is made between logical one and zero, and arithmetic one and zero. A normal full adder operates according to the following truth table, where the columns are labelled (at the top) by arithmetic values represented by logical one and zero. On the right, the sum is listed in decimal notation. The values in columns a, b, c, d, and e below the horizontal line are logical values.

TABLE I

| | inputs | | | : | outputs | | sum |
|---|---|---|---|---|---|---|---|
| | a | b | c | : | d | e | |
| logical 1: | 1 | 1 | 1 | : | 2 | 1 | |
| logical 0: | 0 | 0 | 0 | : | 0 | 0 | |
| | 0 | 0 | 0 | : | 0 | 0 | 0 |
| | 0 | 0 | 1 | : | 0 | 1 | 1 |
| | 0 | 1 | 0 | : | 0 | 1 | 1 |
| | 0 | 1 | 1 | : | 1 | 0 | 2 |
| | 1 | 0 | 0 | : | 0 | 1 | 1 |
| | 1 | 0 | 1 | : | 1 | 0 | 2 |
| | 1 | 1 | 0 | : | 1 | 0 | 2 |
| | 1 | 1 | 1 | : | 1 | 1 | 3 |

The least-significant output bit (e) is commonly called the "sum" bit, and the most-significant output bit (d) is called the "carry" output, because this is how the outputs are generally used. However, at the most-significant bit position, we can take the "carry" output as another sum bit, getting a sum that is one bit longer than the input operands.

The truth tables for other varieties of adders can be derived from this table by changing the representation of the arithmetic values. For example, the truth table for a full adder with inverted outputs is:

TABLE II

| | inputs | | | : | outputs | | sum |
|---|---|---|---|---|---|---|---|
| | a | b | c | : | d | e | |
| logical 1: | 1 | 1 | 1 | : | 0 | 0 | |
| logical 0: | 0 | 0 | 0 | : | 2 | 1 | |
| | 0 | 0 | 0 | : | 1 | 1 | 0 |
| | 0 | 0 | 1 | : | 1 | 0 | 1 |
| | 0 | 1 | 0 | : | 1 | 0 | 1 |
| | 0 | 1 | 1 | : | 0 | 1 | 2 |
| | 1 | 0 | 0 | : | 1 | 0 | 1 |
| | 1 | 0 | 1 | : | 0 | 1 | 2 |
| | 1 | 1 | 0 | : | 0 | 1 | 2 |
| | 1 | 1 | 1 | : | 0 | 0 | 3 |

A truth table appropriate for the sign-bit position is:

TABLE III

| | inputs | | | : | outputs | | sum |
|---|---|---|---|---|---|---|---|
| | a | b | c | : | d | e | |
| logical 1: | −1 | −1 | 1 | : | −2 | 1 | |
| logical 0: | 0 | 0 | 0 | : | 0 | 0 | |
| | 0 | 0 | 0 | : | 0 | 0 | 0 |
| | 0 | 0 | 1 | : | 0 | 1 | 1 |
| | 0 | 1 | 0 | : | 1 | 1 | −1 |
| | 0 | 1 | 1 | : | 0 | 0 | 0 |
| | 1 | 0 | 0 | : | 1 | 1 | −1 |
| | 1 | 0 | 1 | : | 0 | 0 | 0 |
| | 1 | 1 | 0 | : | 1 | 0 | −2 |
| | 1 | 1 | 1 | : | 1 | 1 | −1 |

Two of the inputs (a,b) are sign bits having negative weight, and one input (c), with positive weight, is for the carry input. The most-significant bit of the output (d) is the sign of the output, and thus has negative weight. However, if there is no overflow, that is, if output bit d is not needed, then bit d will be merely a "sign extension", that is, a copy of bit e. Since bits d and e are equal (either 00 or 11), then of the possible sums −2, −1, 0, and 1 (decimal), the extreme values −2 and 1 do not occur. Bit d is ignored (discarded) and the weight −1 is assigned to bit e (now the sign bit).

Comparing Tables I and III, the logical values differ only in column d. Therefore, when we assume no overflow (as for the most-significant bit of the accumulator) and discard bit d, we can use a normal full adder, because the operation of the adder circuit is determined only by the logical values, not by the meanings (arithmetic values) attached to them. On the other hand, if we use the sign output (d) of an adder in the sign-bit position (as in the modulus compare logic), then we cannot use a normal full adder, because the logical values of Tables I and III do not agree in column d.

A full adder whose inputs a and b are inverted and whose output d is inverted (the others are normal) is illustrated by Table IV:

TABLE IV

| | inputs | | : | outputs | | sum |
|---|---|---|---|---|---|---|
| | a | b | c : | d | e | |
| logical 1: | 0 | 0 | 1 : | 0 | 1 | |
| logical 0: | 1 | 1 | 0 : | 2 | 0 | |
| | 0 | 0 | 0 : | 0 | 0 | 2 |
| | 0 | 0 | 1 : | 0 | 1 | 3 |
| | 0 | 1 | 0 : | 1 | 1 | 1 |
| | 0 | 1 | 1 : | 0 | 0 | 2 |
| | 1 | 0 | 0 : | 1 | 1 | 1 |
| | 1 | 0 | 1 : | 0 | 0 | 2 |
| | 1 | 1 | 0 : | 1 | 0 | 0 |
| | 1 | 1 | 1 : | 1 | 1 | 1 |

The logical values of Tables III and IV agree completely. This means that a full adder with inversion at inputs a and b and output d (the bits that have negative weight) will perform the complete function required in the sign bit position. Another way of expressing this conclusion is to show a version of Table III where the bits that have negative weight are given inverted representation:

TABLE V

| | inputs | | : | outputs | | sum |
|---|---|---|---|---|---|---|
| | a | b | c : | d | e | |
| logical 1: | 0 | 0 | 1 : | 0 | 1 | |
| logical 0: | −1 | −1 | 0 : | −2 | 0 | |
| | 0 | 0 | 0 : | 0 | 0 | −2 |
| | 0 | 0 | 1 : | 0 | 1 | −1 |
| | 0 | 1 | 0 : | 0 | 1 | −1 |
| | 0 | 1 | 1 : | 1 | 0 | 0 |
| | 1 | 0 | 0 : | 0 | 1 | −1 |
| | 1 | 0 | 1 : | 1 | 0 | 0 |
| | 1 | 1 | 0 : | 1 | 0 | 0 |
| | 1 | 1 | 1 : | 1 | 1 | 1 |

The logical values of this table completely agree with those of Table I, again showing that a normal full adder can be used if bits a, b, and d are inverted.

I/O AND CONTROL METHODS

Having described the exponentiation, multiplication, modulo, and addition algorithms, an efficient method of getting very large numbers into and out of the implementing hardware, and of controlling the sequence of operations, is now described. There are certain features of the hardware needed to support the algorithms that also can be configured for loading and unloading of data in a manner minimizing the I/O logic cost. The exponentiation algorithm requires a capability of loading the XR, XB, and Y registers from the A register, and the multiplication algorithm requires a capability of shifting the A register. Since input data is shifted into the A register, all registers except the M register can be loaded with these capabilities. Only the capability of loading the M register from the A register need be added. On the other hand, the exponent data does not need to be loaded into a register. Instead, the data is taken one bit at a time, most-significant bit first. But since this data is used serially, the input is similar to the serial input of data to be shifted, except that the shifted data is shifted two bits at a time (because of the modified Booth algorithm). The only data output needed is the result of a multiplication or exponentiation calculation, and the algorithms always leave the result in the A register. Since the A register has a shift capability, this capability can also be used to shift out the resulting data.

For the input data, a component for reading data from a processor bus as "words" (parallel bits), and for converting the data to serial form, is required. A double buffer is an efficient means for this transfer. Data flows from the bus to the first buffer, then transfers to the second buffer where the bits are output in a serial stream. This is efficient because the first buffer can be accepting data from the bus while the second buffer is shifting data.

To operate with a variety of processors, the common word sizes of 8, 16, and 32 bits should be supported. This allows either the full speed of a 32-bit processor or the economy of an 8-bit processor. An easy way to accommodate all of these word sizes is to provide a 32-bit first buffer that is partitioned into four 8-bit bytes. Each byte has a separate input strobe and full/empty status bit. The connection of these bytes to the bus and the external use of the strobes differs for each bus size; but the internal logic remains the same. For a 32-bit bus, the four bytes are separately connected to different bus positions and strobed all at once. For a 16-bit bus, the first and third bytes are connected to one bus position, and the second and fourth bytes connected to another; then either the first and second bytes are strobed at once, or the third and fourth bytes. For an 8-bit bus, all bytes are connected to the same bus position, and must always be strobed separately. In all cases, the first buffer is recognized as full when the four status bits indicate that all bytes are full.

The second buffer also holds 32 bits, and is loaded all at once from the first buffer, then shifted two bits at a time on alternate clock cycles. Shifting on alternate cycles simplifies the logic, because the operation is made similar to the compute cycle, which shifts on alternate clock periods. When the input is exponent data, two exponent bits are processed for each data shift. A counter is needed to count the shifts, or better, to count bits. While counting bits, the second buffer is shifted every other count, and while inputting exponent bits, an odd or even count indicates which bit is being processed.

When the input data is loaded into the accumulator, the modulo operation can optionally operate in the non-shift cycles (as during compute cycles), provided that the M register has been loaded. Loading with this option, then flushing carries, performs a modulo operation alone. The second buffer is effectively an extension of the accumulator register, which functions as a shift register. Actually, the least-significant seven bits of the accumulator and the most-significant seven bits of the second buffer are overlapped so that the scaling details of the hardware do not complicate the external software.

The two buffers operate nearly independently. The control of the first buffer depends on its four status bits: each status bit is set when its corresponding byte is loaded. The control of the second buffer depends on the corresponding shift counter, which can be interpreted as indicating the number of bits remaining in the buffer. The control of the two buffers is linked (or synchronized) when the first buffer is full (all status bits set) and the second buffer is empty (counter indicates zero bits remain). At this time, data is transferred from the first buffer to the second, the first buffer is set empty (all status bits cleared), and the second buffer is set full (the counter set to 32 bits).

The first input buffer can also be used to accept command inputs. The 32 bit size is sufficient for a command code plus a parameter, when needed. In this case, the command code is transferred to a command control register, and if the command indicates that parameter(s) are included, the parameter(s) are transferred to appropriate control registers.

The output data path is also double-buffered, operating like the reverse of the input data path. In this case, the first buffer shifts and the second buffer is partitioned into four bytes that can be unloaded all at once, two bytes at a time) or one byte at a time. The first buffer is actually the 32 bits of the accumulator immediately to the right of the sign bit. The sign bit is not included here, because the final result is always unsigned, and so that the scaling details of the hardware do not complicate the external software.

These buffers operate independently except when the first buffer is full and the second buffer is empty. At this time, data is transferred from the first buffer to the second, the first buffer is set empty (the counter set to zero bits), and the second buffer is set full (all status bits set 'full').

There are conflicting uses for the input logic. For example, the input data may need to be shifted into the accumulator, or it may need to be processed as exponent data, or it may be a command word. Also, there is a conflict between the input and output processes, because both require shifting of the accumulator. These conflicts are resolved by the following modes of the exponentiator control logic:

| Mode | Function of the Mode |
| --- | --- |
| command | interpret each input word as a command |
| input | shift input words into the accumulator |
| exponent | process input words as exponent data |
| output | shift accumulator into output words |

The initial mode is command mode, and commands are accepted in this mode. Three of the commands are special, because they change the mode to 'input', 'exponent', or 'output', and also specify how many bits are to be transferred. After the specified number of bits have been transferred, the mode returns to command code.

The following set of commands support the functions of modulo exponentiation, modulo multiplication, and modulo alone. Addition is not provided as a separate function because a processor can generally do a large integer addition (even modulo-addition) faster than the time needed to load and unload the data. The separate modulo operation is not needed for all applications, but is easily included.

The command code and parameters of each command are formatted in four bytes (32 bits) or less. The input, output, and exponentiate commands change the mode; the other commands do not.

| Command | Parameters |
| --- | --- |
| set parameters | number of compute cycles, number of flush cycles, & options |
| input | number of input bits |
| scale | number of zeros |
| load-registers | register selections |
| exponentiate | number of exponent bits |
| multiply | none |
| output | number of output bits |

The set parameters command loads the number of compute cycles (including special cycles) per multiplication into the Compute Cycles parameter register. This register is used to initialize the Compute Counter at the start of each multiplication; the Compute Counter is used to count the compute cycles, including special cycles. For unsigned input operands p bit-pairs long, the number of compute cycle is $p+4$.

The set parameters command also loads the number of flush cycles per multiplication into the Flush Cycles parameter register. This register is used to initialize the Flush Counter for each multiplication; the Flush Counter is used to count the flush cycles. If logic is provided to detect if any carry-save bits are ones, then the Flush Counter is used to count the minimum number of flush cycles. After the minimum number, flushing stops if the detector indicates that all carry-save bits are zero. Otherwise, the flush count must be set to the maximum count, which is the number of carry-save slices with carry-save outputs (all but the most significant carry-save slice, that is, N/8). However, to simplify the control timing, the flush count is always even (round up).

The options parameter includes these two bits: Clear-Acc, for clearing the accumulator; and Mod-Load, for enabling the modulo operation during loading if this bit is set. The modulo operator can be applied alone to any size input, using a properly scaled modulus in the M register, by loading the input with the Mod-Load option set, then unloading.

The input command sets a word counter, clears the accumulator, and changes the mode to input mode. The count parameter gives the number of words to be loaded. In cases where the data is not a whole number of words, the last word may be filled will zeros on the right. Since the accumulator is first cleared, zeros precede the loaded data on the right. This supplies a zero sign bit in $A(N+7)$ when unsigned data is loaded, the first word being shifted up to $A(N+6, \ldots, N-25)$. As the data is loaded, the word counter is decremented. When the counter is zero (all data loaded), the mode is changed back to command mode.

The data is loaded by shifting the data two bits at a time into the accumulator on alternate clock cycles. If the Mod-Load option bit was set by the set parameters command, the modulo operation is enabled during the non-shift cycles. Of course, the modulus should have been previously loaded (with the Mod-Load option cleared). The modulo operation actually will not take effect (mf will be zero) until the data reaches the most-significant carry-save slice. If the input data is longer than the hardware registers, the modulo operation will continue to reduce the data, preventing overflow.

The scale command specifies a number of zero bit-pairs to be loaded. The specified number of pairs of zero bits are shifted into the accumulator from the right. This command provides a faster way to append zeros to the right of loaded data than by loading zero words. This command supports the scaling method discussed above which allows data that is shorter than the hardware registers to be processed. Some of the zeros required by the scaling method may be in the last word loaded.

The load registers command copies the contents of the accumulator, shifted seven bits to the right, into all of the specified registers. One parameter bit per register enables loading of XB, XR, Y, and/or M. The set parameters and load registers commands can be used to quickly zero the exponentiator. The Mod-Load option can be used to apply the modulo operation to the b, x, and/or y operands of the exponentiate or multiply operations as they are loaded.

The exponentiate command sets a bit counter, clears the accumulator, and changes the mode to exponent mode. The count parameter gives the number of exponent bits. The XB, XR, Y, M, compute cycles, and flush cycles registers must have been loaded previously. The exponentiation function is computed as the exponent data is inputted. The first exponent bit must be a one, and must be the most-significant bit of the first input word. The bit counter is decremented as the exponent bits are processed. The processing will wait, if needed, for the next input word. However, waiting is generally not necessary, since from 32 to 64 multiplications (48 on average) are computed per word, which gives the external software plenty of time to provide the next word. When the bit counter reaches zero (all exponent bits processed), any remaining bits of the last input word are ignored, and the mode is changed back to command mode. The result of the calculation is available in the accumulator at this time. The next command is normally either an output command or a load-registers command.

The multiply command clears the accumulator, then computes the product of XB times Y modulo M, leaving the result in the accumulator. The XB, Y, M, compute cycles, and flush cycles registers must have been loaded previously. The XR register is not used. The multiply command does not change the mode, but the input register (next command) will be ignored until the multiplication is completed. The next command is normally either an output command or a load-registers command.

The output command prepares the control logic for unloading of the accumulator. This command sets a word counter and changes the mode to output mode. The count parameter gives the number of words to be unloaded. In cases where the data is not a whole number of words, the last word may be filled will zeros on the right. Before unloading, the accumulator sign bit (bit N+7) is tested. If the bit is a logical one (the accumulator value is negative), then 128 times the modulus is added to the accumulator, and the accumulator carries are flushed as is done after each multiplication. Since the accumulator value is 128 times the result, this adds the modulus to the result, and in either case, the result is now non-negative but less than the modulus. Since the sign bit is always zero before unloading, there is no need to unload the sign bit. To begin unloading, the first 32-bit word (bits N+5, ..., N−25) of the accumulator is transferred to the output buffer. As the processor reads the data from the output buffer, the accumulator is shifted to the left and transferred to the output buffer. The word counter is decremented for each word transferred. When the word counter is zero (all words transferred to the output buffer), the mode is changed back to command mode.

The following status bits are made available to be read by the processor as one status word:

| Number of Bits | Status Description |
|---|---|
| 4 | input full flags |
| 4 | output full flags |
| 1 | busy flag |
| 2 | current mode |
| 1 | Mod-Load enabled |
| 1 | modulus out of range |

The four input full flags indicate the status of the four bytes of the first input buffer. The four output full flags indicate the status of the four bytes of the second output buffer. The busy flag is set when the exponentiator is busy executing a command, and not ready to read a command from the first input buffer. It is set during the input, output, and exponent modes, and while processing the scale and multiply commands. The current mode is one of the four modes, i.e., input, output, exponentiate, or command. The Mod-Load enable flag indicates that the modulo operation is enabled during loading; it is set or cleared by a set parameters command. The modulus-out-of-range flag is produced by the Modulus Check Logic (described further below).

Some of the status bits are redundant, or partly redundant. The Mod-Load flag echoes one of the parameters of the set parameters command. The current mode status can be used to verify that the input, output, or exponentiate commands have been recognized as commands rather than as input data. The transition of the current mode back to command mode can be used to verify the counting of input words.

The software uses the input status flags to control the sending of input data. After the last input data word has been sent and the input status indicates that the first input buffer is empty (ready for another word), the next command can be sent, even before the mode returns to command mode. This would be the fastest method, since the command would be immediately available when the command mode begins. When the input buffer becomes empty again, this indicates that the command was read. Checking the current mode before sending another word will verify the word count, except if the command were an input command. The exception is avoided because the next command is generally not an input command. An alternative software method is to wait for the mode to change to command mode before sending the command word, but this method is slower.

The busy flag is also redundant, providing an alternative (but slower) means of control in addition to the input and output status and the current mode status. For example, after sending a multiply command, the software could first wait for the input buffer to be ready. This would indicate that the multiply command was read, and that the exponentiator has started to be busy computing the multiplication. Next, the software could send an output command and wait for the output buffer to be full. When the exponentiator is done with the multiplication, it will check the input buffer, which will have the output command immediately available. Executing the output command, the first output word will be transferred to the output buffer. When the software detects that the output buffer is full, this indicates that the multiplication is done. This method is faster than waiting for the busy flag, because it takes full advantage of the double buffering.

ARITHMETIC LOGIC STRUCTURE

Most of the arithmetic logic of the modulo exponentiator device is constructed by repeating the bit slice 30 shown in FIG. 3. Each bit slice includes storage and logic associated with one bit position of the arithmetic. Other arithmetic and control logic, described later, is added to the bit slices, but only the logic shown in FIG. 3 is repeated for each bit. For example, the carry-save register does not appear here because it has only two flip-flops per eight bit positions.

Each bit slice is identified by its bit position, indicated by "n" in the figure. Each bit slice includes bit n of each register, with the exception of the M register. Bit n−7 of the M register is included in slice n to minimize the number of inter-slice connections. Expressions such as n−2 are used to refer to other bit positions relative to position n. The ranges of values of n for which various bits exist are defined later with respect to the most-significant and least-significant carry-save slices.

Explicit connections (line and arrow) are shown for the data signals. Control signals are indicated by the circled pairs of lower-case letters, which are briefly defined in the list accompanying the figure. All slices receive the same clocks and controls operating in unison.

Each element labelled "REG" is a flip-flop or latch (one bit of a register). The XR, XB, and M registers 31, 32, and 33, respectively, can be made of latches, because these registers never need to be read and written at the same time. The Y and A registers 34 and 35, respectively, must be made of edge-triggered flipflops, because data is shifted in these.

Each element labelled "MUX" is a multiplexer. One of these (36a) is controlled by the signal "sx" and selects one of the two X registers. Another (36b) is controlled by "sm" and selects either the X register or (with a shift) the M register, and provides both true and inverted outputs. Across all slices, these multiplexers select one of XR, XB, or 128*M. The next multiplexer 36c is controlled by signal "sf" and selects one of four combinations of inverted (or not) and shifted (or not) of these outputs, and can also select none (zero). Across all slices, these multiplexers select one of −2, −1, 0, 1, or 2 times the selected input (XR, XB, or 128*M), which is the "F" input to the adder 37. The "so"-controlled multiplexer 36d selects the accumulator (A) either shifted left two bits (4*A) or not shifted (A), or selects neither (zero), producing the "G" input to the adder 38. The "H" adder input is provided to accommodate carry inputs and accumulator data shifted from another (cascaded) device. These inputs vary for different bit positions, and are set to zero when not needed.

The adders 37 and 38 are full adders of the bit slice and receive the F, G, and H inputs to the adder logic. The R1, R2 (ripple carry) signals are serial inputs and outputs. Across all eight bit slices of a carry-save slice, the full adders are arranged in two tiers. The R1 ripple-carry signals connect one string of adders 38, and the R2 ripple-carry signals connect the other string of adders 37. The R1 and R2 inputs to the least-significant bit slice of a carry-save slice are connected to logical zero. The R1 and R2 outputs of the most-significant bit slice of a carry-save slice are connected to additional carry-save logic.

When the accumulator (A register) is clocked, the sum of the F, G, and H operands is clocked into the accumulator. The control logic must select appropriate operands for each clock cycle. To clear the accumulator, for example, zero is selected for all operands so that the sum will be zero. When the XR, XB, or M register is clocked, the accumulator contents, shifted right seven bits, are loaded into that register. The shift occurs because bit n+7 of the accumulator is connected to bit n of the destination register (and bit n+6 to bit n−1, bit n+5 to bit n−2, etc.) Since slice n includes bit n−7 of the M register, the shift is shown differently in the case of the M register, but the shift is seven bits to the right in all cases. The Y register is clocked with the "sy" control signal selecting the A(n+7) input to load the Y register from the accumulator, with a shift as for the loading of the other registers. The Y register is clocked with the "sy" control selecting the Y(n−2) input to shift the Y register two bit positions to the left during a multiplication operation.

For each bit slice, as shown in FIG. 3, similar signals appear on the left and right borders of the diagram, and the bit number of every signal on the left is one more than the corresponding signal on the right. To complete this pattern, two "pass-through" signals Y(n−1) and A(n−1) pass from right to left through the diagram without any internal connections. This illustrates how the physical layout of bit slice logic cells can be arranged to accomplish most of the data connections between bit slices simply by positioning them side by side.

FIG. 4 illustrates the side connections of the bit slices. The ripple-carry chains (R1 and R2 signals) might be made to operate faster by using adders with inverted carry outputs (and possibly also inverted sum outputs). If this strategy is used, some of the signals may have different polarities for odd or even bit positions. That is, odd and even bit slices may require inverters in different places. In this case, an odd and an even bit slice can be combined to form a two-bit slice, and each carry-save slice can be made of four two-bit slices.

In the preferred circuit, eight bit slices and additional logic are combined to form a carry-save slice which is used as a basic component of the exponentiator device, as illustrated in FIGS. 11 and 12. There are five varieties of carry-save slices, as described further herein with reference to FIGS. 5 to 9. In the master exponentiator device 110 shown in FIG. 11, an input register 111 and accumulator extension 112 are arranged with a least-significant carry-save slice 113, a series of common carry-save slices 114, an out-boundary carry-save slice 115 at the output side of the device boundary, an in-boundary carry-save slice 116 at the input side of the device boundary, another series of common carry-save slices 114, and a most-significant carry-save slice 117. An output register 118 is connected to the processor bus interface, as is input register 111. A control interconnect is coupled to a local control decoder 119 for local control of all carry-save slices. A master sequencer unit 120 couples the control logic, including modulus-check logic 121, modulus-compare logic 122, booth encoding logic 123, and command/status logic 124, to the control interconnect.

When the exponentiator devices are cascaded, one or more slave exponentiator devices, as shown in FIG. 12, are connected in series to the master exponentiator device shown in FIG. 11. The in-boundary carry-save slice 116 is connected to receive data from a preceding device, and the out-boundary carry-save slice 115 is connected to send data to a succeeding device. All common carry-save slices 114 are connected in series. A local control decoder 119 is provided, but otherwise all other control logic and I/O elements (indicated in dotted lines) as used in the master device are omitted.

Figure 5A:
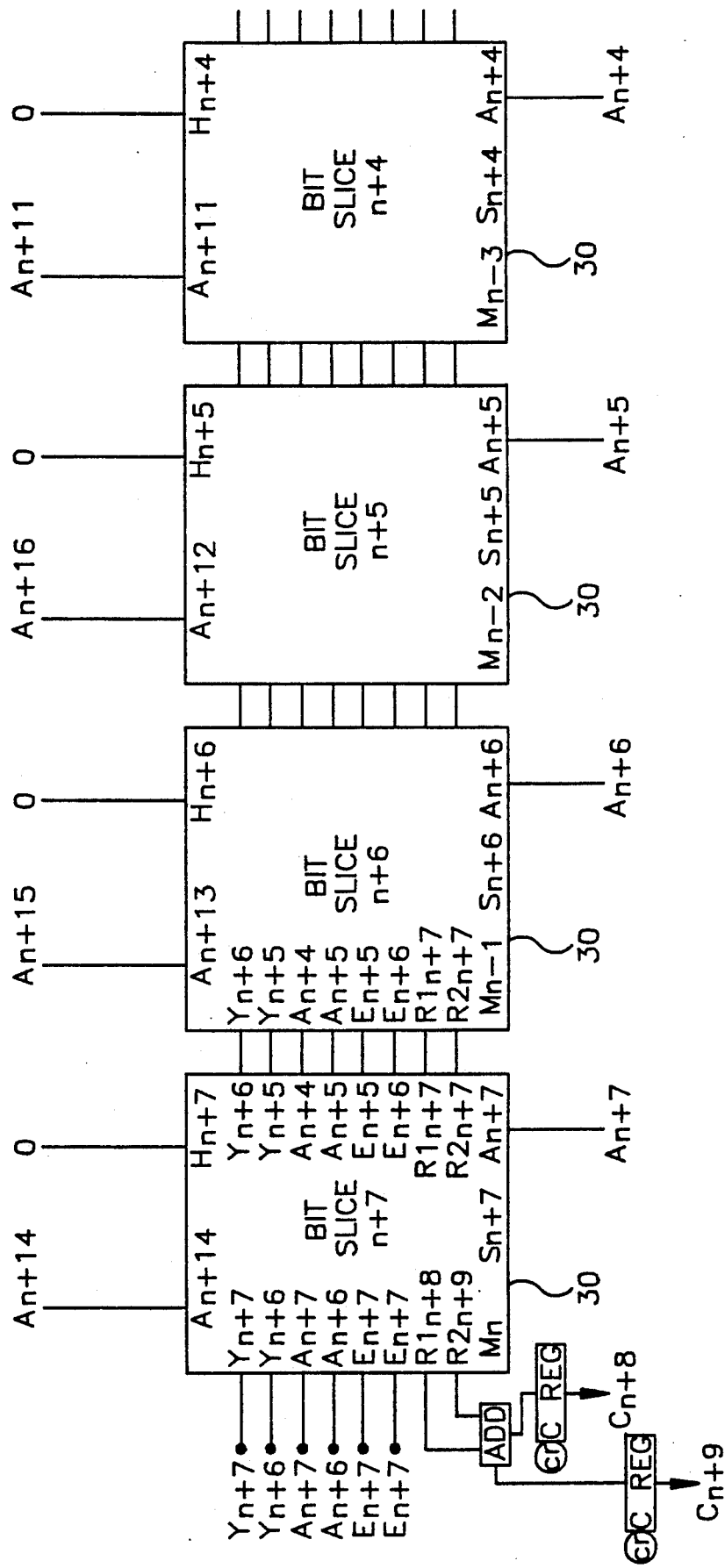
FIGS. 5A and 5B show connections between bit slice components that comprise a larger component which we call a "common carry-save slice".
Figure 5B:
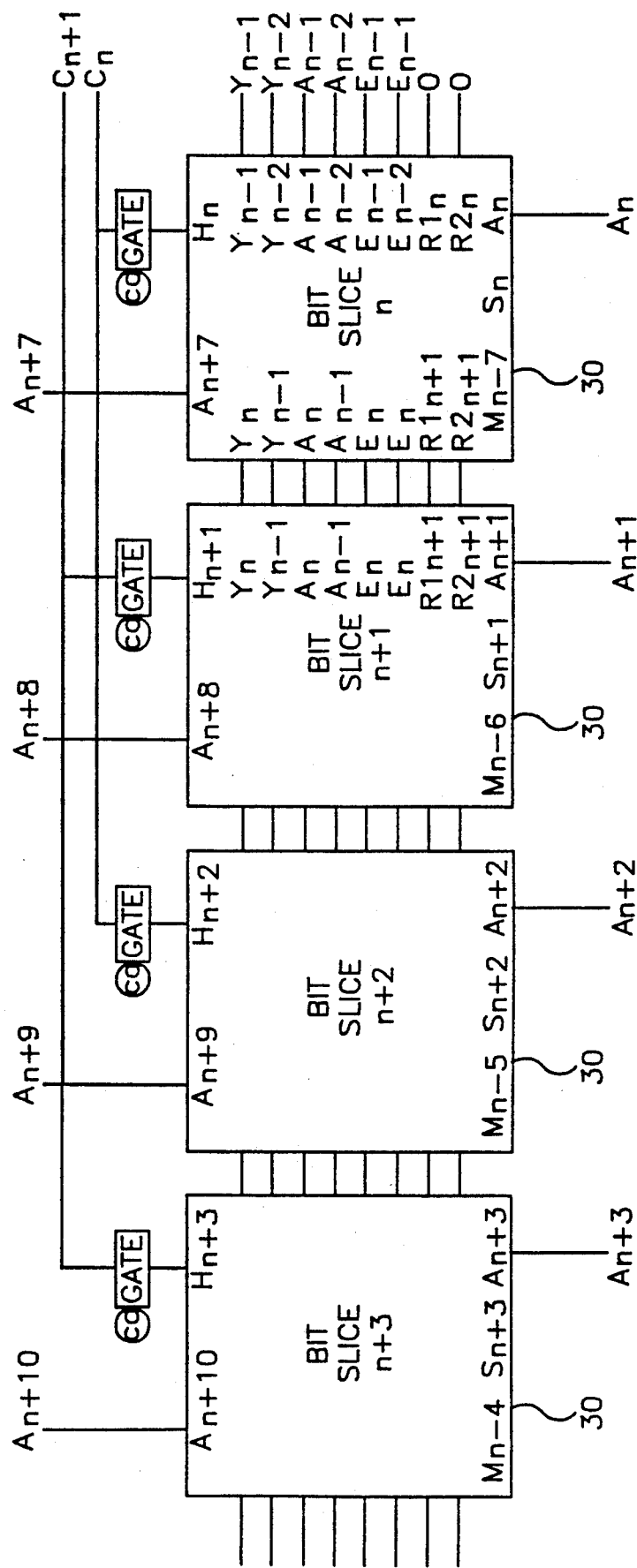

In the common carry-save slice shown in FIG. 5, the Y, A, and E side connections between bit slices and between carry-save slices provide for the shifting of operands. The R1 and R2 (ripple carry) side connections, however, connect bit slices but not carry-save slices. The R1 and R2 inputs to the carry-save slice are connected to zero (not used); and the R1 and R2 outputs from the carry-save slice are connected to a half-adder (adder with two inputs). The half-adder adds two carry bits with the same weight $(2n+8)$ to form a two-bit saved carry (consecutive weights). The outputs of the half-adder are clocked into a slice of the carry-save register ("C REG") with the same signal (ca) used to clock the accumulator. Carry-save register bit 8 of each slice goes to the flush-done detection logic, which OR-gates these bits.

The carry-save inputs $C(n+1)$ and $C(n)$ from the neighboring carry-save slice (not shown) on the right are gated into the H inputs rather than the R1, R2 inputs because these bits must enter bit slices $n$ and $n+1$ (when not shifting) or bit slices $n+2$ and $n+3$ (when shifting). The H inputs to bit slices $n+3 \ldots n$ are provided by four gates. The two gates with "sa" controls are enabled whenever the accumulator is shifted to put the carry-save input bits $C(n+1)$ and $C(n)$ into shifted positions; and the two gates with "sa" controls are enabled whenever the accumulator is not shifted to put the carry-save input bits into unshifted positions. This control is simply a variation of the "sa" control used to control the "sa" multiplexer in the basic bit slice logic, as shown in the following table:

| sa function | sa mux | sa gate | sa* gate |
|---|---|---|---|
| select 4*A | select A(n−2) | enable | disable |
| select A | select A(n) | disable | enable |
| select 0 | select 0 | disable | disable |

The remaining H inputs (bit positions $n+7 \ldots n+4$) are connected to zero (not used). Where the adders in the bit slices receive zero inputs, those adders are equivalent to half-adders. Providing actual half-adders to reduce the number of logic gates would create more varieties of bit slices. The M and S outputs of the bit slices are shown, but not used here. These outputs are used only by the most-significant and out-boundary carry-save slices.

Figure 6A:
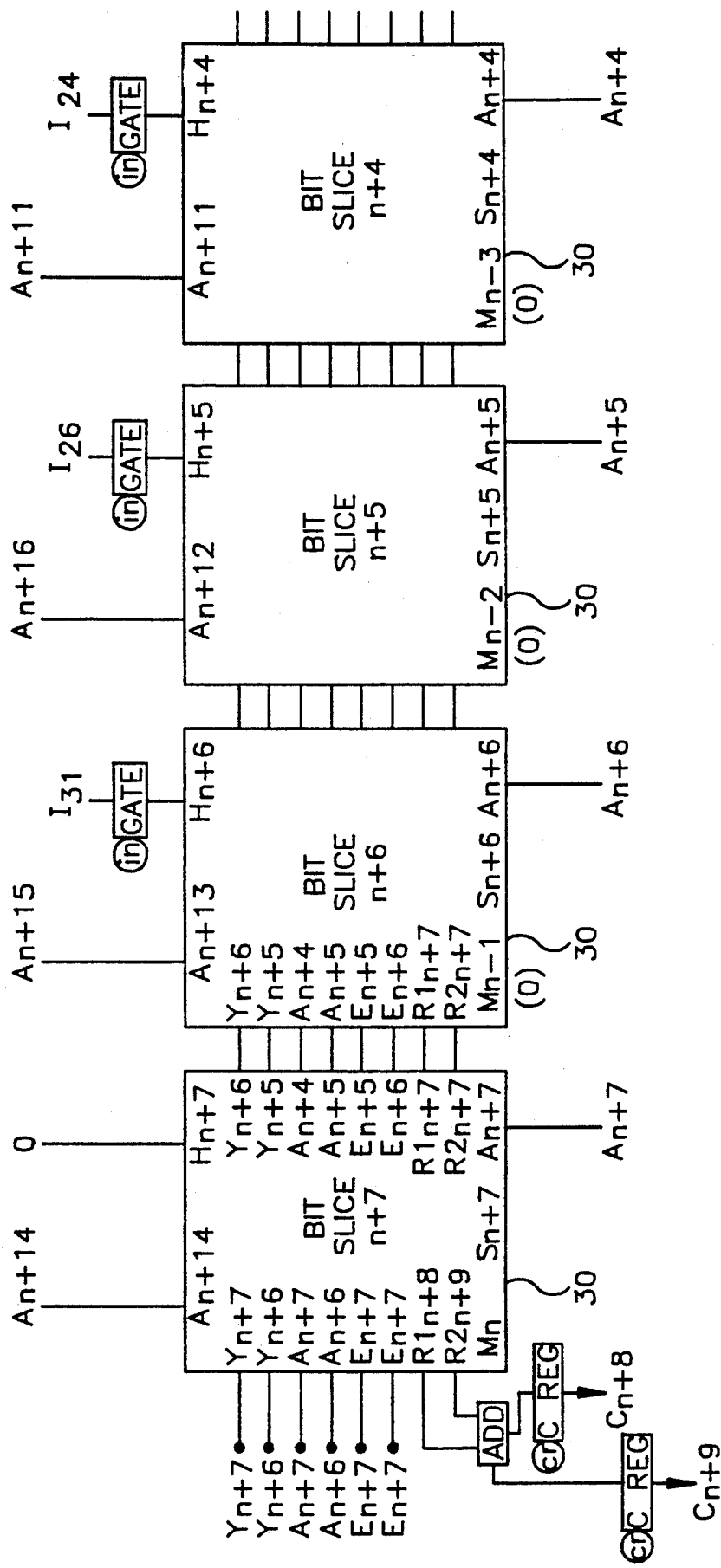
FIGS. 6A and 6B show connections between bit slice components that comprise a larger component which we call a "least-significant carry-save slice".
Figure 6B:
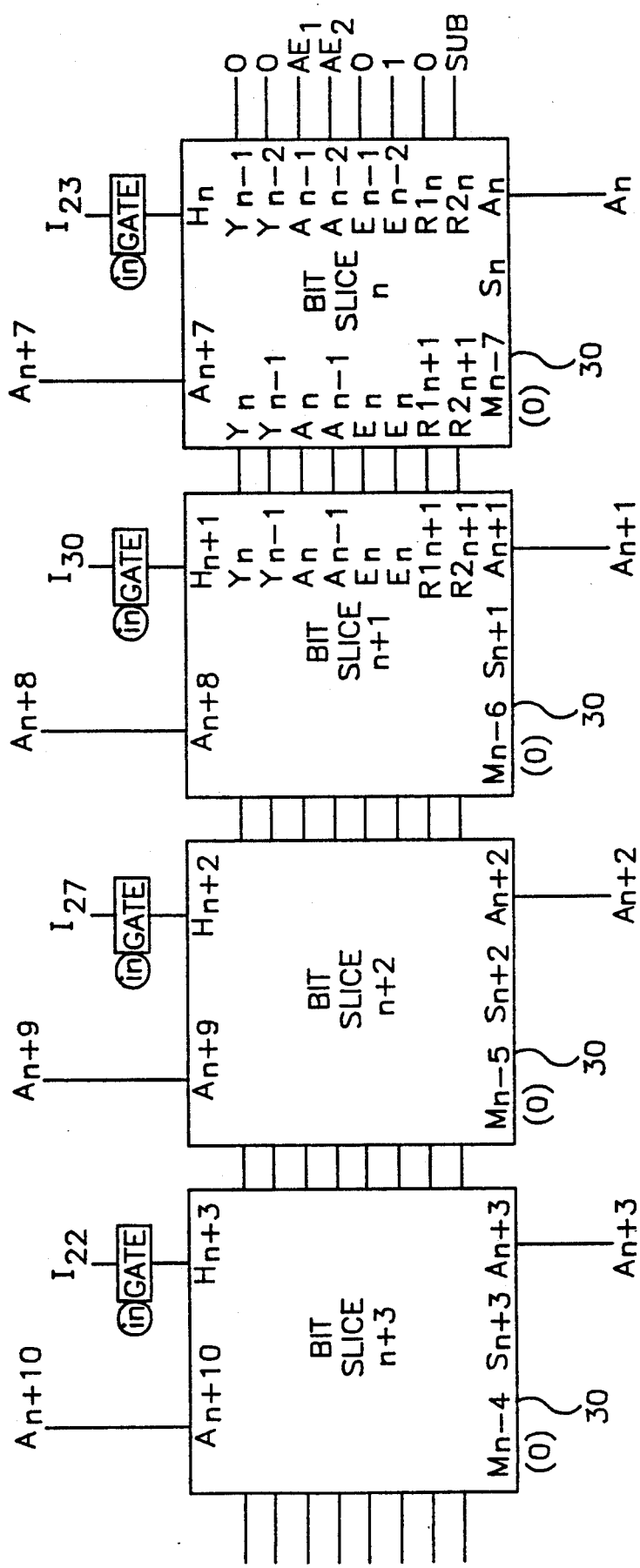

In FIG. 6, a least-significant carry-save slice is shown which is used once per device, for the least-significant eight bit positions, and is coupled to the data input logic. It is similar to the common carry-save slice, except for the following differences. For this carry-save slice, $n=0$. Also, there are no true carry inputs: the $R2(0)$ input is connected to the SUB control signal, which is true whenever a subtraction is done, and the $R1(n)$ input is connected to zero. The H inputs, used elsewhere for carry inputs, are used here to accept input data.

Along the top of FIG. 6, seven gates make the $H(6, \ldots, 0)$ inputs equal the data $I(30, \ldots, 25)$ from an input register when the 'in' signal is enabled, otherwise the H inputs are zeros. The logic of the 32-bit input register I and a 25-bit extension AE to the accumulator are described further herein. During a data loading cycle, the 32 bits of the accumulator and 25 bits of the accumulator extension accept data from the input register and shift the data to the left to load the remainder of the accumulator, and become all zeros when loading is complete. The $Y(n)$ and $Y(n-1)$ inputs are connected to zero, so that zeros will be shifted into the Y register. Near the end of each multiplication cycle, these zeros reach the Booth encoding logic at the other (left) end of the Y register, where they make $xf=0$ for the special cycles.

Figure 7A:
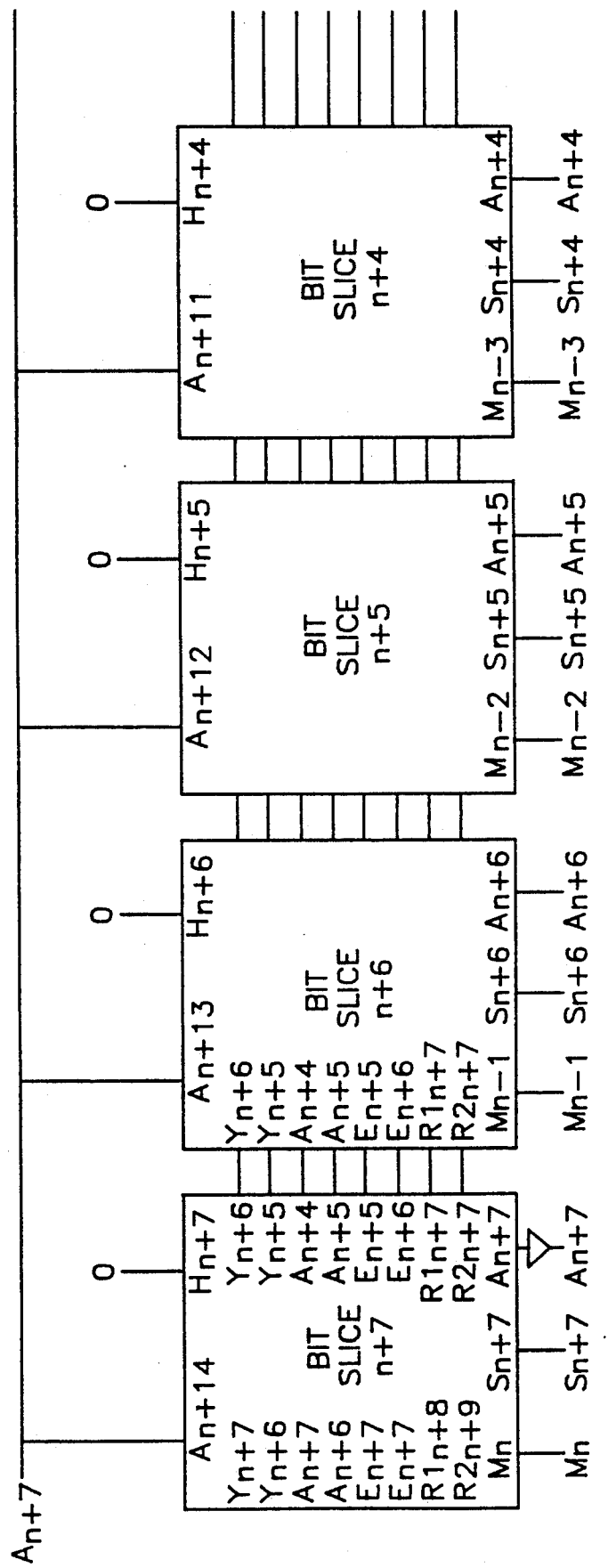
FIGS. 7A and 7B show connections between bit slice components that comprise a larger component which we call a "most significant carry-save slice".
Figure 7B:
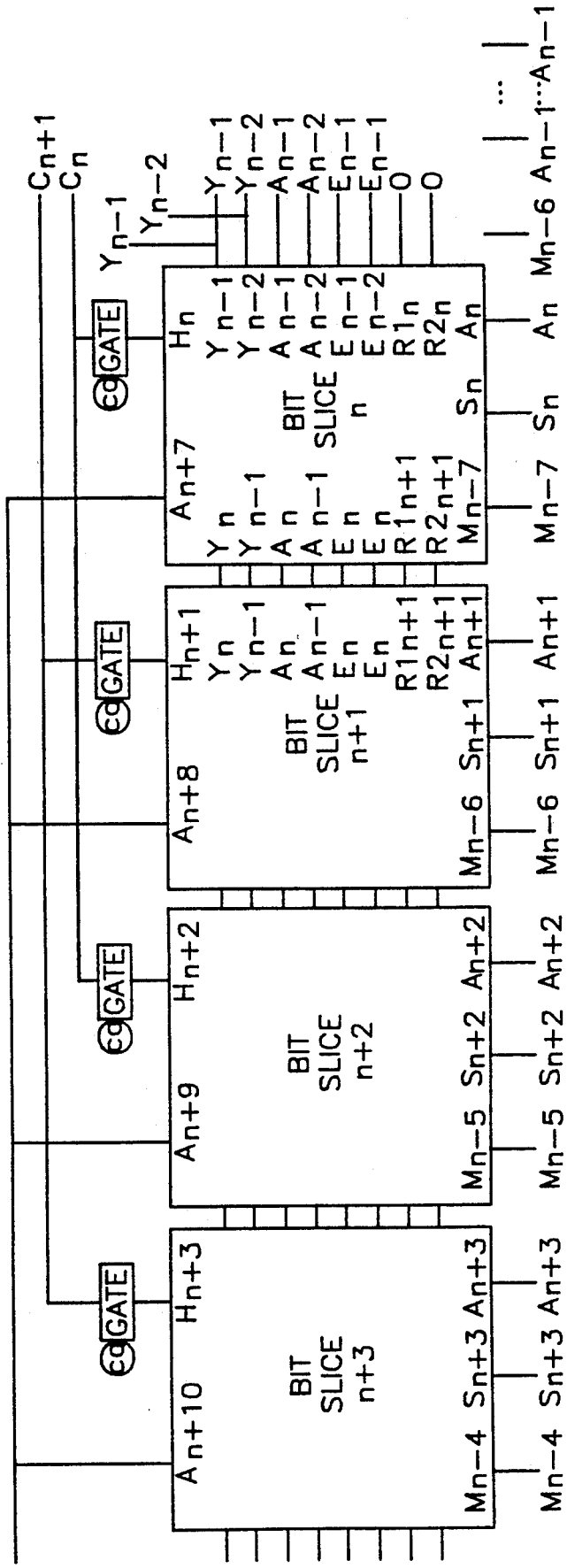

As shown in FIG. 7, the most-significant carry-save slice is used once per system for the most significant eight bit positions, and is coupled to the data output, modulus comparison, Booth encoding, and modulus checking logic. For this carry-save slice, $n=N$, the maximum length of the modulus. There are no carry outputs, and none of the side-connections at the left are used. The $A(N+14, \ldots, N+8)$ inputs to bit slices $(N+7, \ldots, N+1)$ require bits beyond the left end of the accumulator. These bits are a "sign extension" (copies of the sign bit) of the accumulator; thus the sign bit $A(N-7)$ is connected to all of the inputs $A(N+14, \ldots, N+7)$, and a buffer is added to provide the extra fan-out. The XB, XR, and Y registers each have seven extra bits in this carry-save slice; and these connections extend the sign when any of these registers are loaded from the accumulator.

The external software will normally load unsigned data, that is, data that lacks a sign bit because the data is assumed to be always non-negative. A zero sign bit can be prepended to the unsigned input data either by loading a zero word preceding the data or by loading the accumulator after it has been cleared. The accumulator can be cleared by explicit command or by unloading the accumulator (zeros are shifted in as the data is shifted out).

The M register has one extra bit $M(N)$; that is, it has a sign bit even though the modulus should always be positive. The sign bit is normally loaded with a zero. Bits $M(N, \ldots, N-2)$ are connected to the modulus check logic, which checks that the modulus is positive and properly scaled. There are also outputs from the most-significant carry-save slice and nearby common carry-save slice to the output logic, the modulus compare logic, and to the booth decoding logic.

Figure 8A:
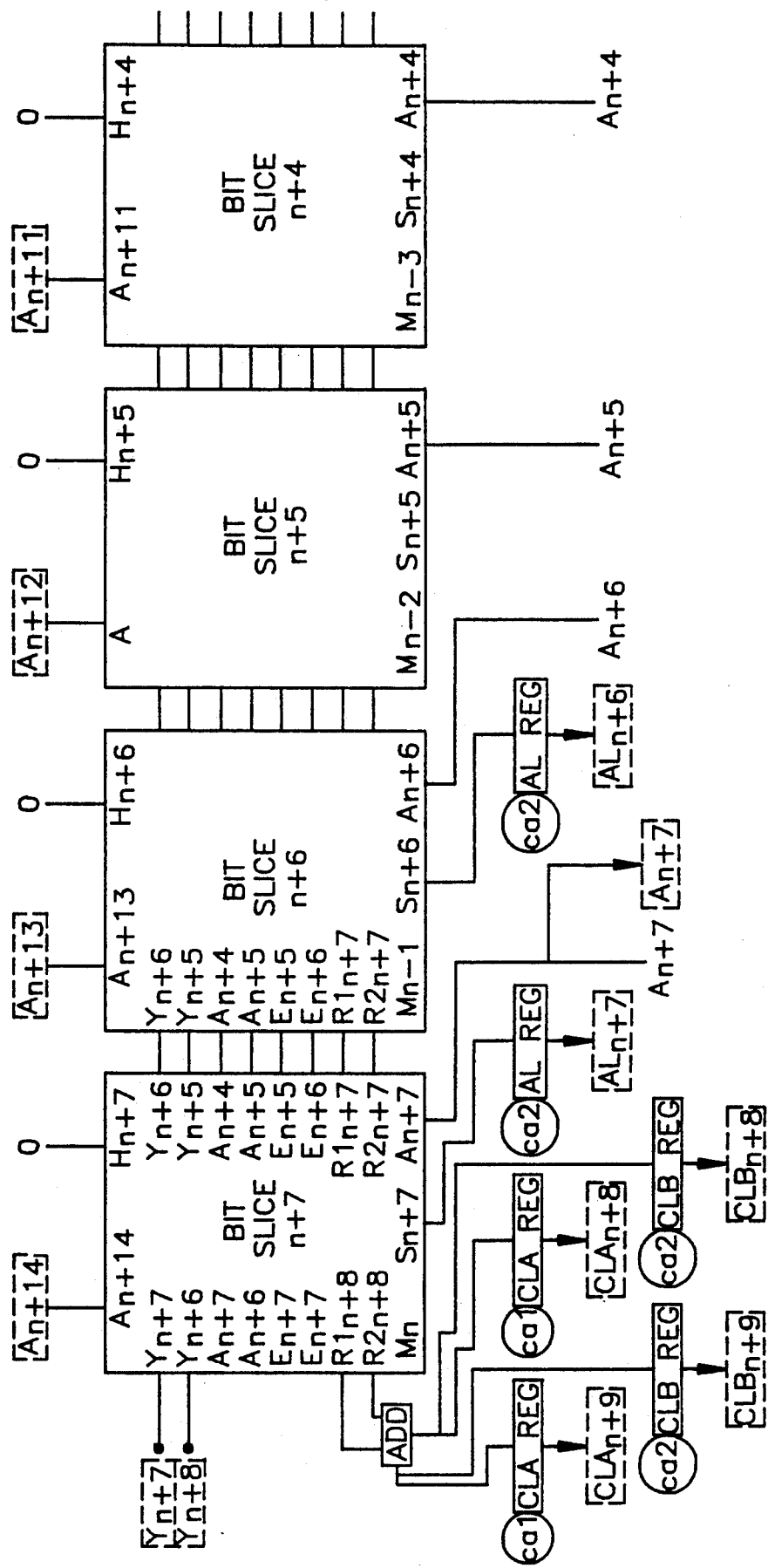
FIGS. 8A and 8B show connections between bit slice components that comprise a larger component which we call an "out-boundary carry-save slice".
Figure 8B:
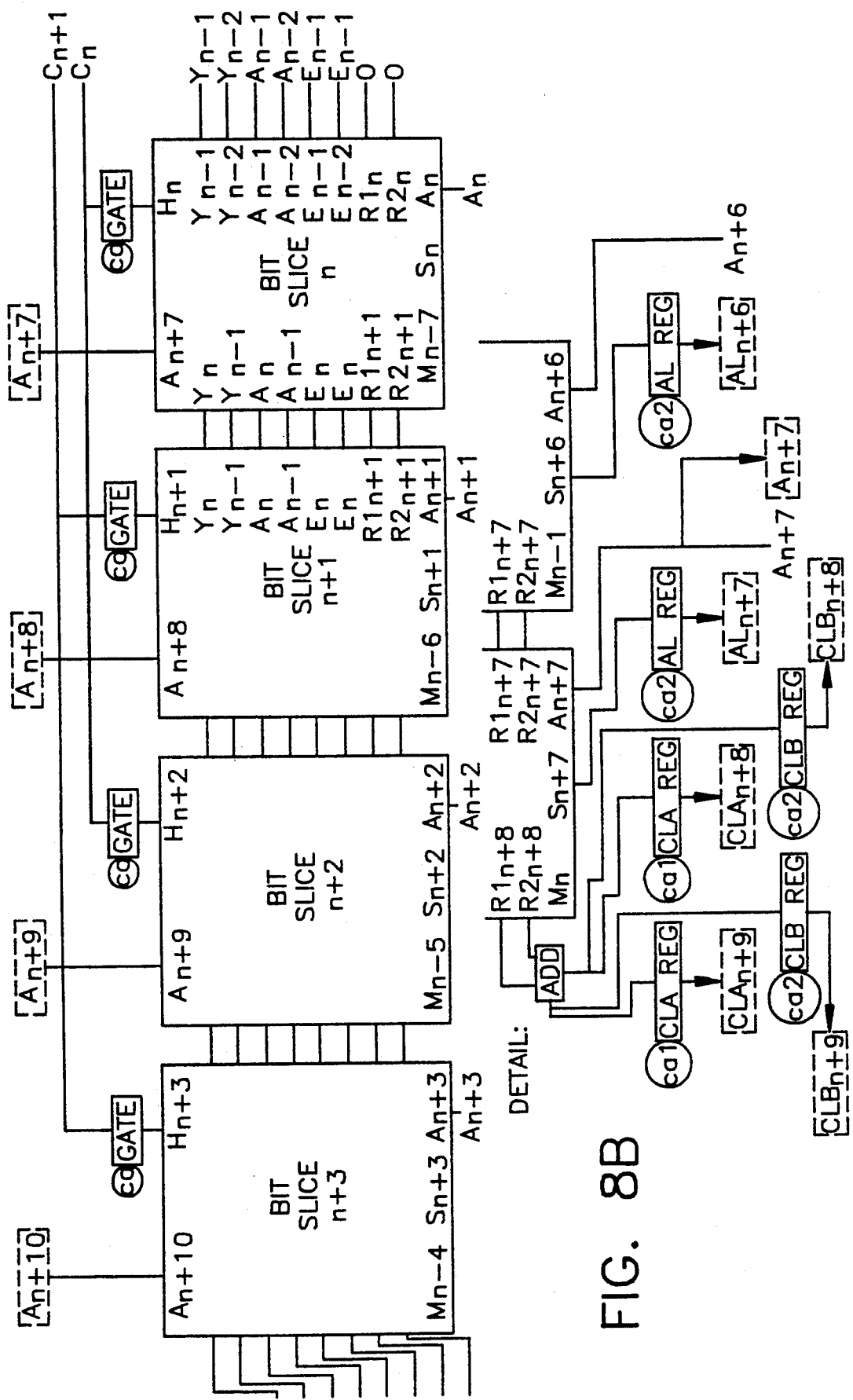
Figure 9A:
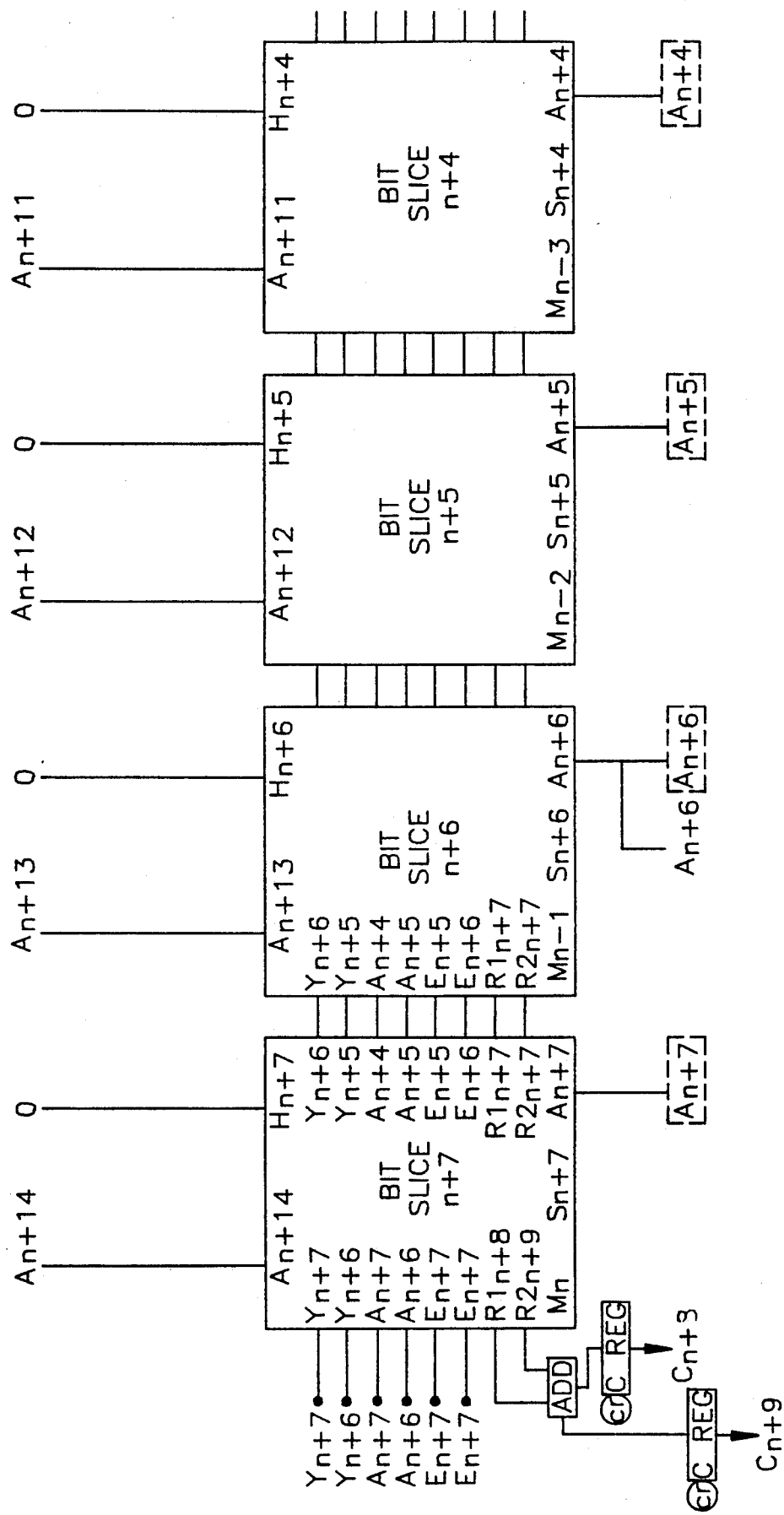
Figure 9B:
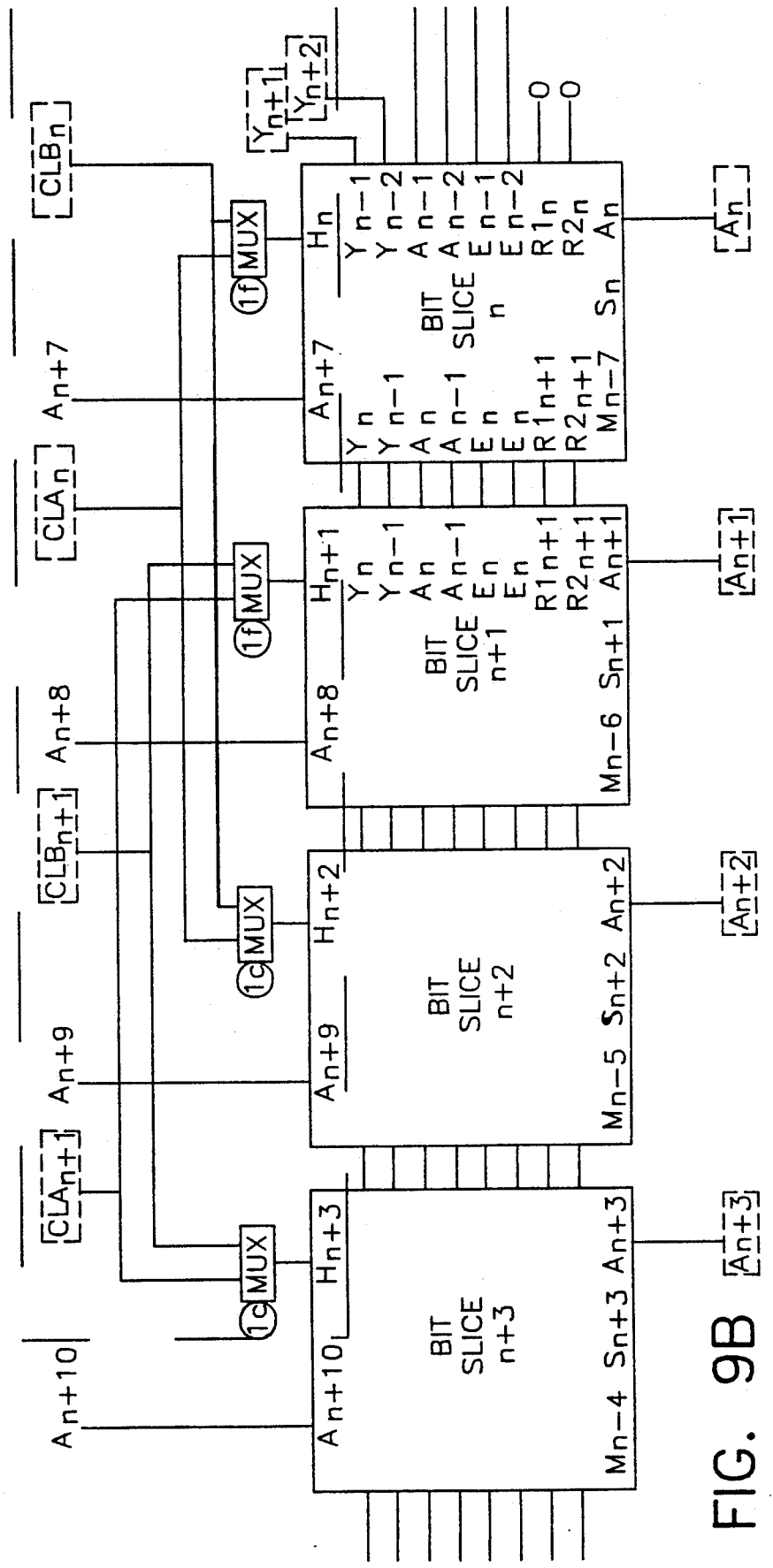

The boundary slices are the carry-save slices at the boundary of a device, as shown in FIGS. 8, 9, and 13, wherein a carry-save slice of one device must connect to a carry-save slice of another device. Data is transferred in both directions across the boundary, but more frequently from the out-boundary slice to the in-boundary slice. The position of the boundary is designated by $j$, the arithmetic bit position immediately to the left of the boundary. That is, carry-save slice $j$ (bits $j+7, \ldots, j$) is the in-boundary slice connecting to out-boundary slice $j-8$ (bits $j-1, \ldots, j-8$). The data interconnections at the boundary are arranged so that each boundary signal transfers data no faster than half of the clock rate. This allows at least one clock period for data transport (buffer and transmission delays) and another clock period for data processing (logic delays).

When data in the accumulator is transferred to the XR, XB, and/or Y register after a loading cycle or a modulo-multiplication cycle, the data is shifted seven bits to the right. This requires the signals $A(j+6), \ldots, A(j)$ to cross the device boundary from left to right as shown in FIG. 13. Two clocks periods are allowed for the data transfer. When transferring data from the accumulator to the M register, the data is also shifted seven bits to the right.

Figure 10:
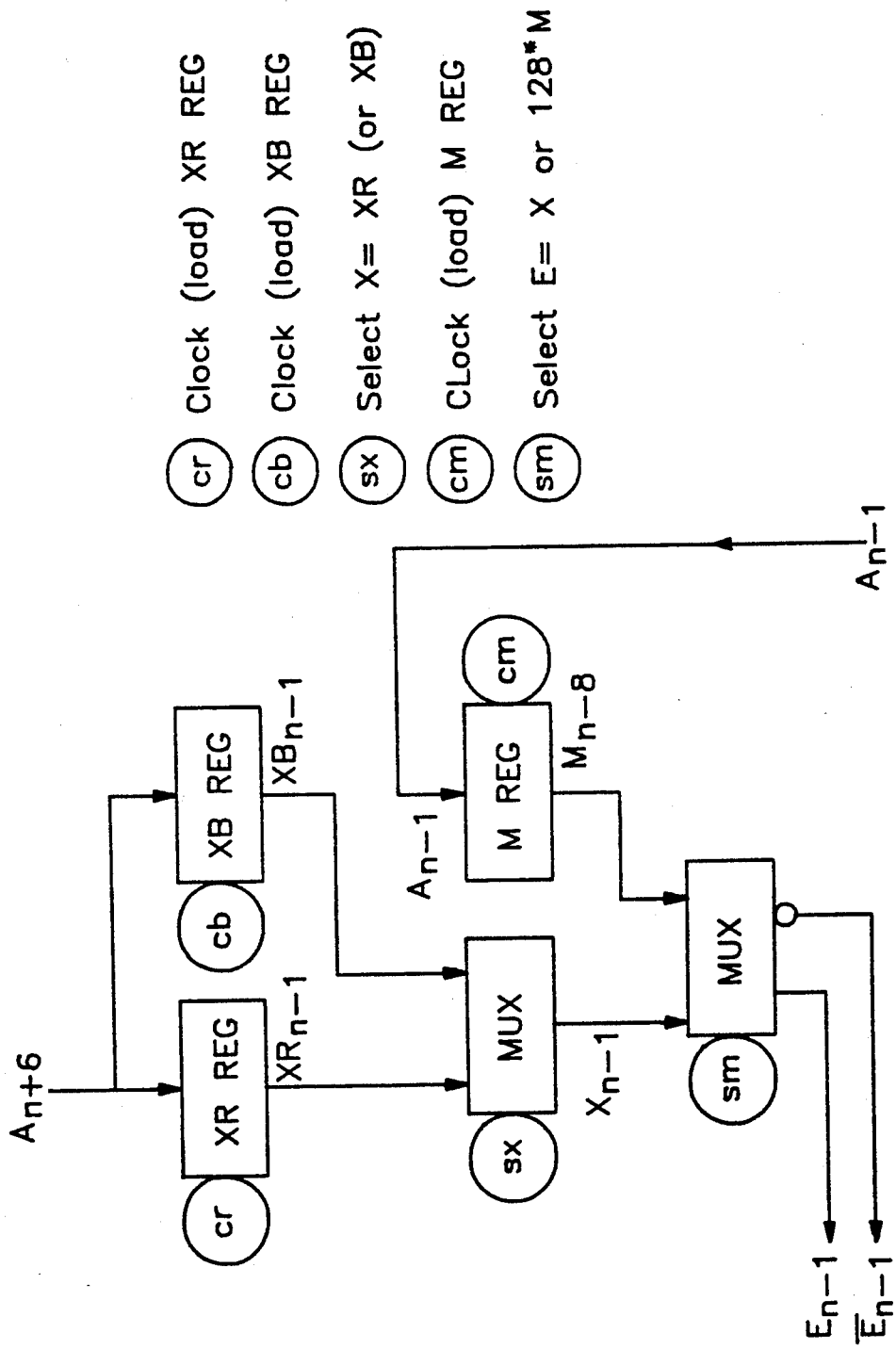
FIG. 10 shows the architecture of a "partial bit slice" component.

The signal A(j−1) crossing the boundary from right to left in FIG. 13 requires explanation. To avoid transferring the E(j−1) and −E(j−1) signals across the device boundary at the clock rate during a multiplication, bit slice j−1 in the device at the right is partially duplicated in the device at the left. The partial slice is detailed in FIG. 10. The partial bit slice includes duplicate copies of bit j−1 of the XR and XB registers, and bit j−8 of the M register. The duplicate XR and XB bits are loaded from A(j+6) via internal connections, but M(j−8) is loaded from A(j−1) via the external connection shown in FIG. 13. As noted before, two clock periods are allowed for register transfers.

The Y(j−1) and Y(j−2) connections shown in FIG. 13 support the shifting of the Y register during multiplications. The Y register is shifted once per two clock periods, so that here, too, two clock periods are allowed for external transfers. The CLA, CLB, and AL signals are carry-save and accumulator data with modified timing, supporting a method of transporting this data across the device boundary at half the rate (per each signal) used at internal slice boundaries. Before describing this method, we will first describe an internal slice boundary by showing the data flow and timing in a unified manner in FIG. 14. We will then use the same mode of description for the device boundary, to make it clear that the operations on the data remain the same even though the timing is modified.

Figure 14:
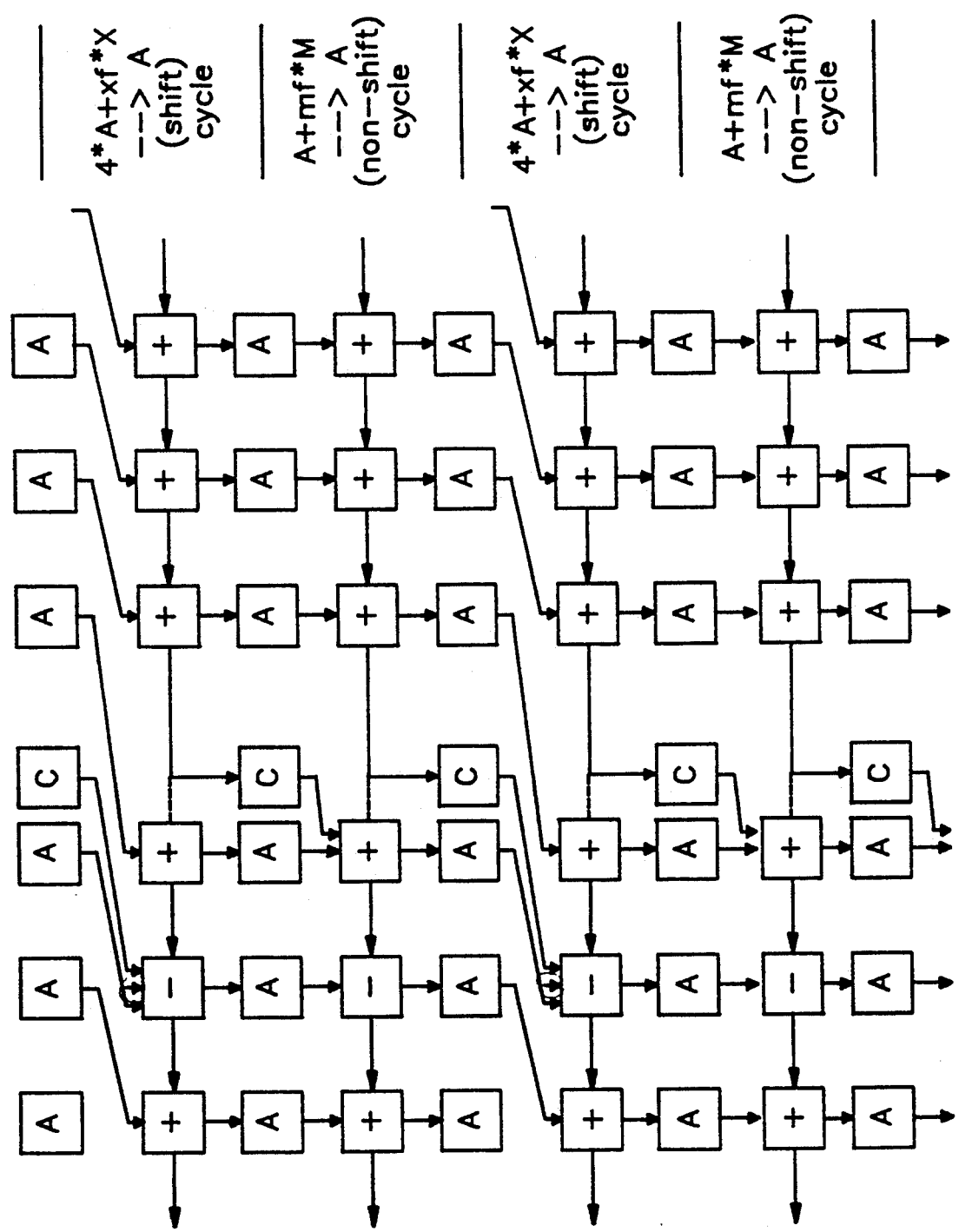
FIG. 14 is a schematic diagram of data flow/timing at an internal slice boundary.

In FIG. 14, each box represents a two-bit function, wherein A indicates two bits of the accumulator register, C represents two carry-save bits, and + represents two bits of the adder logic. The top row of the diagram represents six accumulator bits (three pairs) on each side of a typical slice boundary at a typical clock period during a multiplication operation. The next row of accumulator and carry bits represents the same part of the accumulator one clock period later. The data flow shown between these rows indicates how the data flows from the accumulator through the adder and back into the accumulator during the clock period. The dotted lines show how the data would flow if ripple-carry were used entirely instead of the carry-save method. Only the accumulator and carry inputs to the adders are explicitly shown; the other adder inputs are indicated at the right of the diagram.

The first and second clock periods shown are the two cycles of a typical compute cycle. In the shift cycle, the accumulator is shifted and a selected X factor is added. In the non-shift cycle, the accumulator is not shifted and a selected M factor is added. The diagram shows two compute cycles. Wherever an A and C block are shown very close together, this indicates that the accumulator and carry-save bits have the same arithmetic significance (the bit numbers would be the same). Note that both bit-pairs always flow to the same two-bit adder, whether shifted or not. If the ripple-carry addition method were used exclusively, these bit-pairs would be added immediately (as indicated by the dotted lines), but in the carry-save method used here, the addition is delayed. The always-ripple flow can be used as a reference to check the carry-save flow by observing that by either method, the carry bits eventually arrive at the same bit positions.

Figure 15:
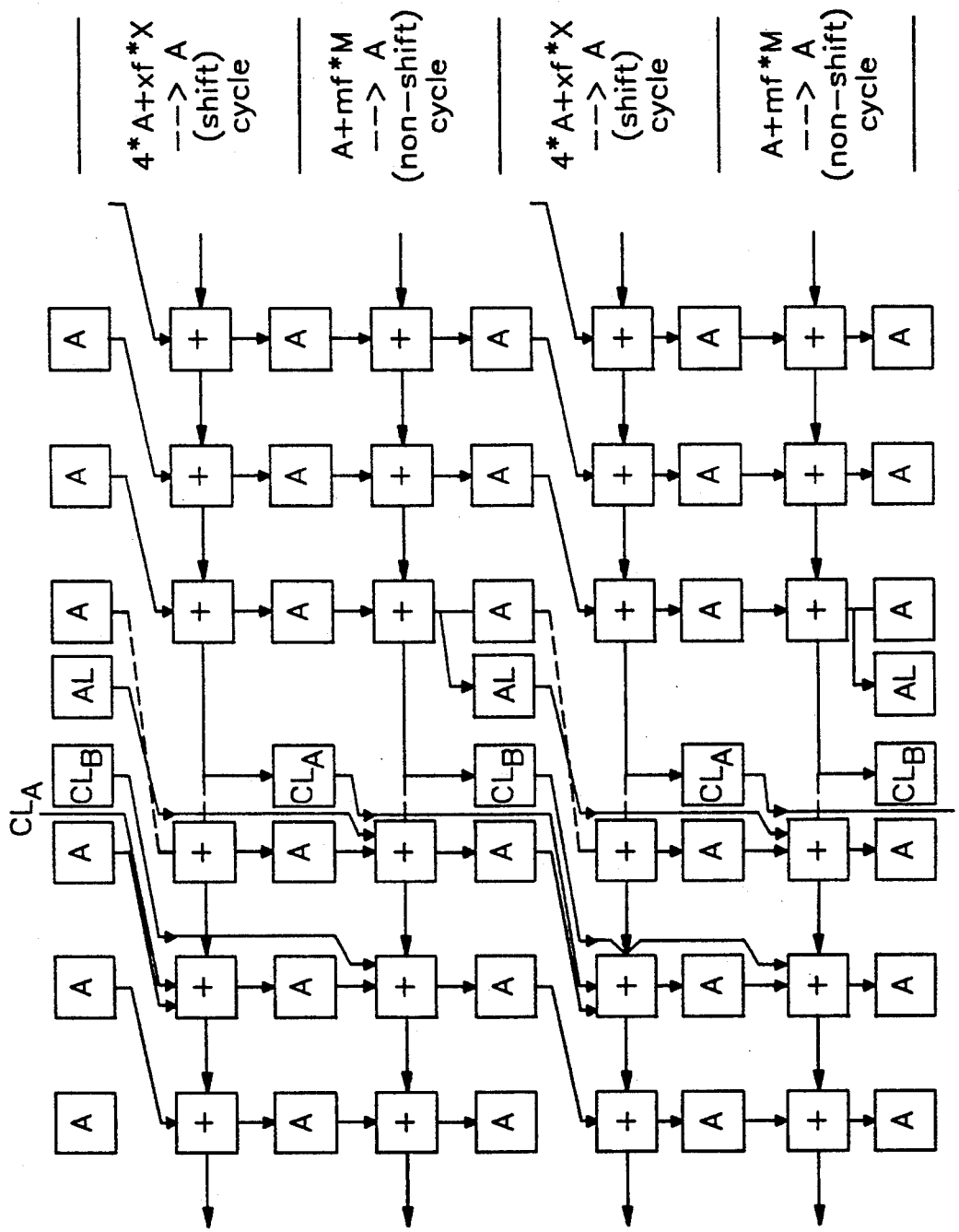
FIG. 15 is a schematic diagram of data flow/timing at a device boundary during a compute cycle.

FIG. 15 uses the same notation as in FIG. 14 to show how the same two compute cycles are modified where the slice boundary occurs at a device boundary. To facilitate verification of the arithmetic correctness of the modifications, the always-ripple carry flow is indicated by dotted lines as before. Dotted lines are also used to indicate the previous flow of non-carry accumulator bits where the flow of these bits have been modified. The C bit pairs are replaced alternately by CLA and CLB (carry link) bit pairs, and that AL (accumulator link) bit pairs are included. These flip-flops (parts of the accumulator) are clocked on alternate clock periods. The row in which the bit pair is shown indicates the time that the flip-flops are clocked. The outputs of these flip-flops are the only data that cross the device boundary during the computation. These outputs are available for the next two clock periods, except that, allowing for transmission delays, the data is not used until the second clock period. The bit pairs shown very close together have the same arithmetic significance. By tracing both the always-ripple carry flow and the modified carry flow, it can be confirmed that eventually, the carries arrive at the same bit positions. Likewise, the A and AL data flows can be compared.

The logic rules are somewhat modified. In the shift cycle of a compute cycle or special cycle, the CLA data is added in a shifted position and the carry out of the adder is clocked into the CLA register. In the non-shift cycle, the CLB and AL data are added in shifted positions, and data is clocked into the CLB and AL registers. To simplify the control logic, it is not necessary to prevent the most-significant adder outputs of the slice from entering both the AL register and the normal A bit-pair, because when this happens, the data in the normal A bit-pair is not used. At the beginning of a multiplication, the CLA, CLB, and AL registers must be cleared as well as the normal C and A registers.

Figure 16:
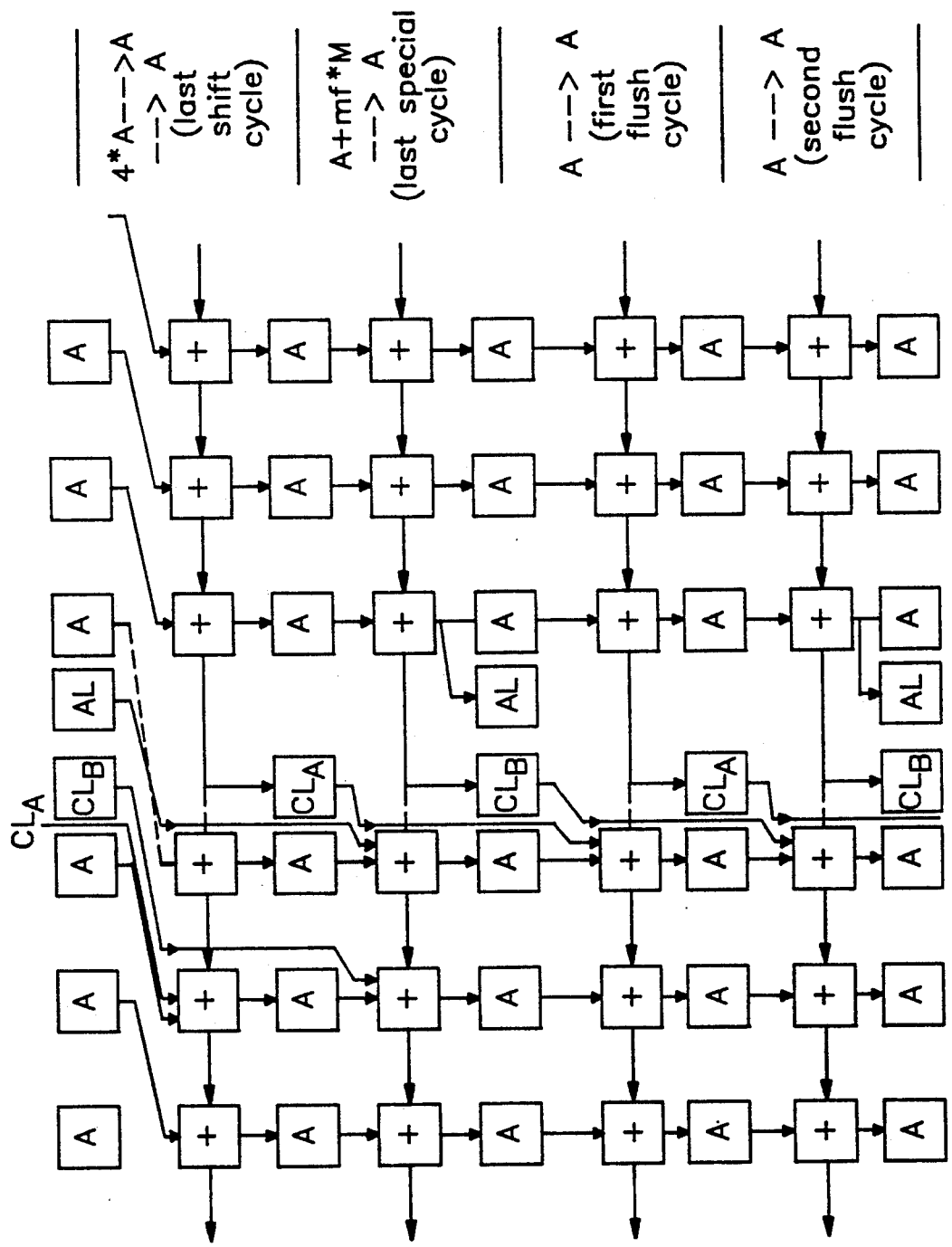
FIG. 16 is a schematic diagram of data flow/timing at a device boundary during a transition from compute cycles to flush cycles.

FIG. 16 shows the data flow and timing at the device boundary when, at the end of a multiplication, there is a transition from the special cycles to the flush cycles. The shift and non-shift cycles of the last special cycle operate as shown before in FIG. 17. During the flush cycles, the CLA, CLB, and AL registers are clocked as before, but the CLA and CLB outputs are added in unshifted positions, and the AL output is not used. Tracing the data flows confirms that no special rules are needed at the transition provided that data is clocked into the normal A bit-pair as well as the AL bit-pair; the next cycle determines which bit-pair will be used. The flush cycles are now arranged in pairs so that the CLA and CLB registers can be clocked alternately.

Referring back to FIG. 8, the out-boundary carry-save slice is used once per device for the eight bit positions at the left boundary of the device, and is coupled to the in-boundary carry-save slice of another device via cascade interface data signals. It is similar to the common carry-save slice, especially the inputs, but differs in the following ways. The signal names enclosed in dotted line rounded shapes in FIG. 8 are the boundary interface signals also shown in FIG. 13. At the device boundary, bits can be referenced to the boundary position j as well as to the carry-save slice position n. For this carry-save slice, bit slice n may also be called bit slice j−8, and bit slice n+7 (nearest the device boundary) may also be called bit slice j−1.

At the bottom left of FIG. 8, the pair of carry-save register bits $C(n+g)$ and $C(n+8)$ have been replaced by two pairs of carry link bits, and the "ca" clock control for the carry-save bits is replaced by "ca1" and "ca2" clock controls. The CLA(n+9) and CLA(n+8) bits are clocked by "ca1" during the first cycle of double clock cycles such as compute, special, and flush cycles. The CLB(n+9) and CLB(n+8) bits are clocked by "ca2" during the second cycle of double clock cycles. The carry-link bits CLA(n+8) and CLB(n+8) go to the flush-done detection logic in place of C(n+8).

Also, new accumulator link bits AL(n+7) and AL(n+6) are loaded from the adder outputs S(n+7) and S(n+6) when enabled by "ca2". The internal logic of the bit slices is not modified, so that the same adder data is also loaded into A(n+7) and A(n+6) in bit slices n+7 and n+6. The accumulator link bits are used instead of the A(n+7) and A(n+6) signals at the left boundary of slice n+7 (=j−1) when the accumulator is shifted. A partial bit slice on the other side of the device boundary is used instead of the E(n+7) and −E(n+7) signals at the left boundary of slice n+7.

In FIG. 9, the in-boundary carry-save slice is used once per device for the eight bit positions at the right boundary of the device, and is coupled to the out-boundary carry-save slice of another device via cascade interface data signals. It is similar to the common carry-save slice, especially the outputs, but differs in the following ways. The signal names enclosed in dotted-line rounded shapes in FIG. 9 are the boundary interface signals also shown in FIG. 13. At the device boundary, bits can be referenced to the boundary position j as well as to the carry-save slice position n. For this carry-save slice, bit slice n may also be called bit slice j.

The input portion at the top right of FIG. 9 is shown in detail in the box and the bottom of the diagram. Multiplexers MUX direct the carry link data to the appropriate H inputs of bit slices n+3 to n according to the method described with respect to FIGS. 15 and 16. The "1c" control selects the CLA and CLB inputs on alternate clock cycles of compute and special cycles, at shifted bit positions n+3 and n+2, but the multiplexers output zeros for other cycles. The "1f" control selects the CLA and CLB inputs on alternate clock cycles of flush cycles, at unshifted bit positions n+1 and n, but the multiplexers output zeros for other cycles. Also, two gates enable the AL inputs at appropriate times. The "1a" control enables the AL inputs on the second clock cycle of compute and special cycles, at shifted bit positions n+3 and n+2, but the gates output zeros for other cycles.

Figure 17A:
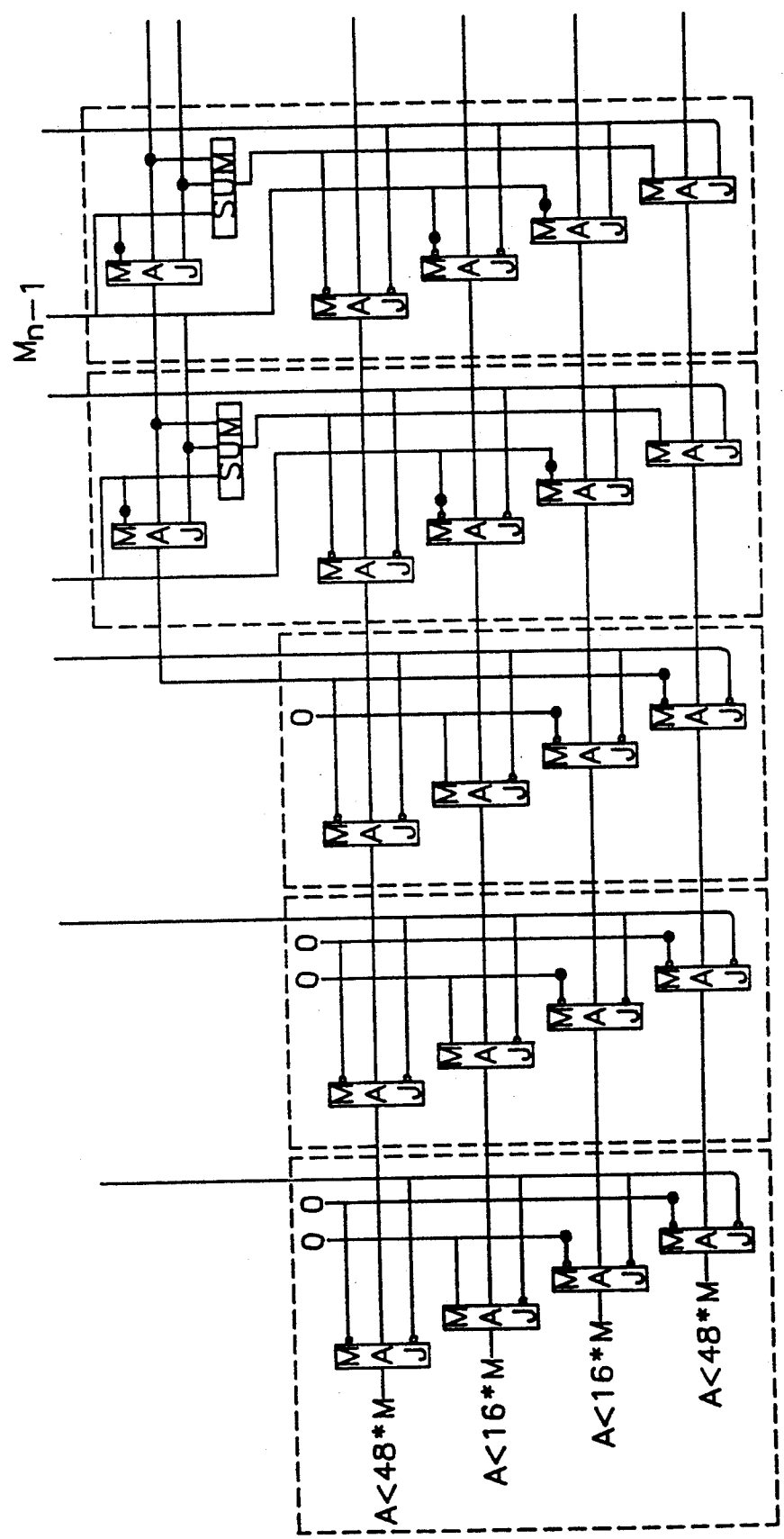
FIG. 17 is a schematic diagram of modulus comparison logic.
Figure 17B:
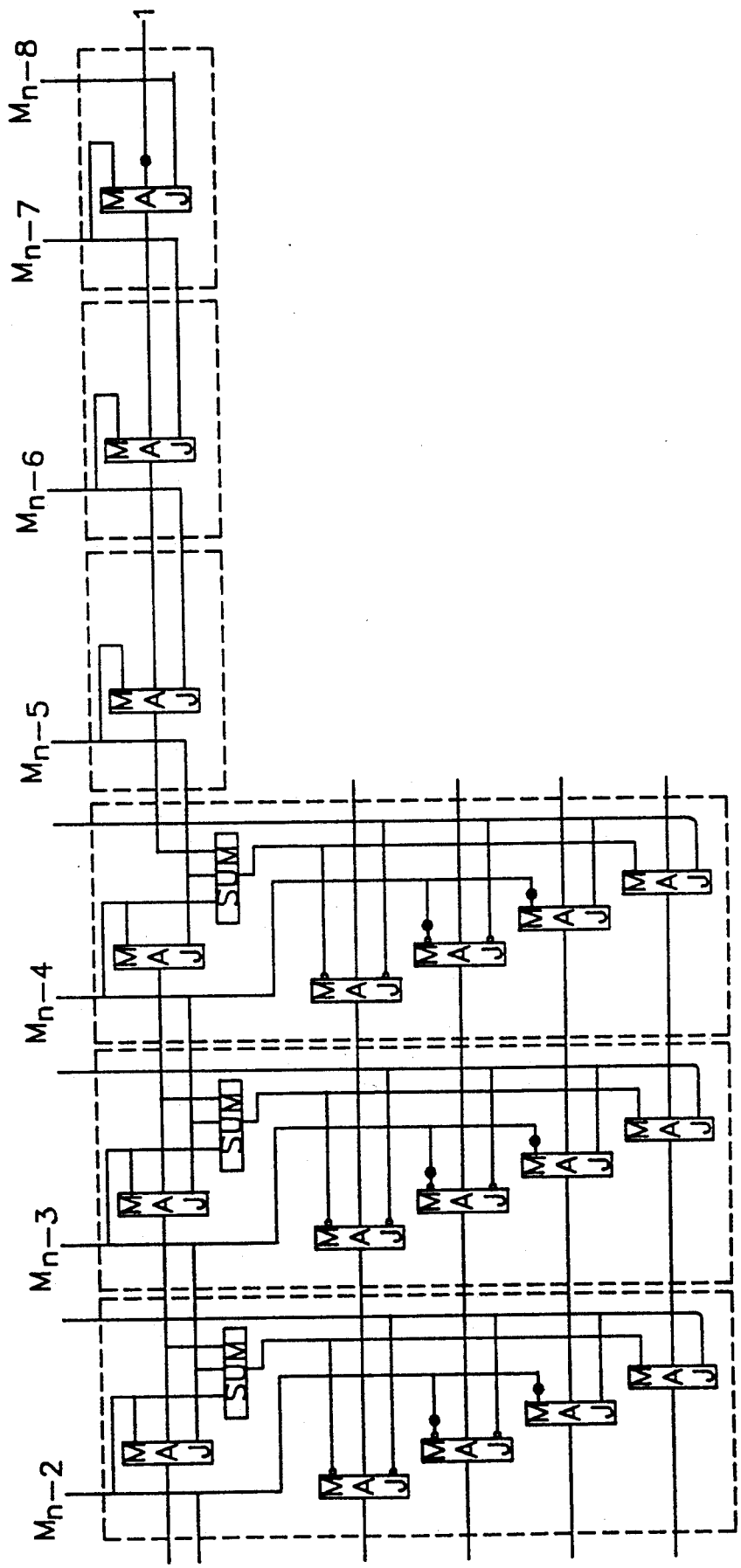

The modulus comparison logic is shown in FIG. 17. This logic is connected to the most-significant carry-save slice 117 (slice N), as shown in FIG. 11. However one input, M(N−8), comes from the next slice (slice N−8). The inputs to the accumulator S(N+7), . . . , S(N) are used instead of the outputs of the accumulator A(N+7), . . . , A(N) as inputs to the modulus comparison logic. This allows the modulus comparison logic to operate nearly concurrently with the slice adder logic. Concurrent operation may seem to be impossible, since the comparison logic gets inputs from the adder. However, the least-significant bits are propagated from the adder to the comparison logic before the more-significant bits, with the result that the adder ripple and comparator ripple occur in parallel.

At the top of FIG. 17, two shift positions of M register data (representing 16*M and 32*M) are summed by an eight-bit adder to obtain an approximation of 48*M. Each bit position of this adder (except the least-significant three positions) is made of a full adder, and each full adder is made of a majority (MAJ) gate and a SUM gate. No SUM outputs are needed for the three least-significant bit positions; this part of the adder is used only to reduce the truncation error. The adder stages are ripple connected; the carries propagate to the left. At the left of this adder, M(N) is assumed to be zero (as well as implied higher bits of M), so more adder stages are not needed.

Below the adder, each of the four rows of majority gates forms a comparator. Each comparator can be understood as an adder, where only the sign bit of the sum is used. For example, the bottom row adds accumulator data to the sum from the top row, for the sum A+48*M. The output at the bottom left is the sign bit of the sum A+48*M, which is a logical one when A+48*M<0, that is, when A<−48*M. The carry inputs of the adder and comparators are logical one. The inputs to the most-significant comparator bit positions are inverted because this is the sign bit position.

Figure 18:
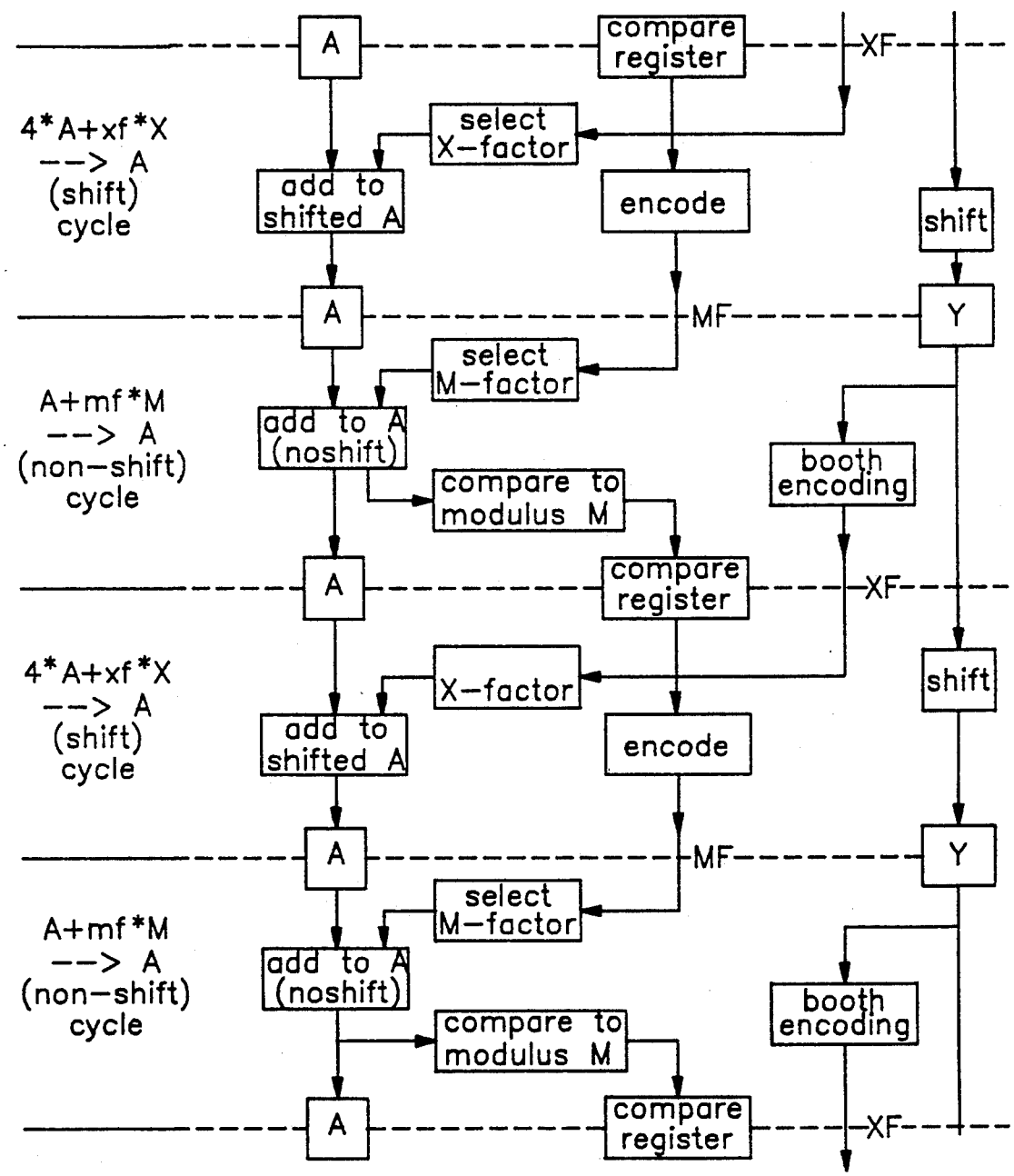
FIG. 18 is a data flow diagram of the compute cycle data flow/timing.

The other logic control elements, including the modulus-check logic and Booth encoding logic, can be implemented in similar fashion according to the algorithm functions and operations as previously described for such elements. The data flow and timing for a complete cycle is illustrated in FIG. 18.

Figure 19:
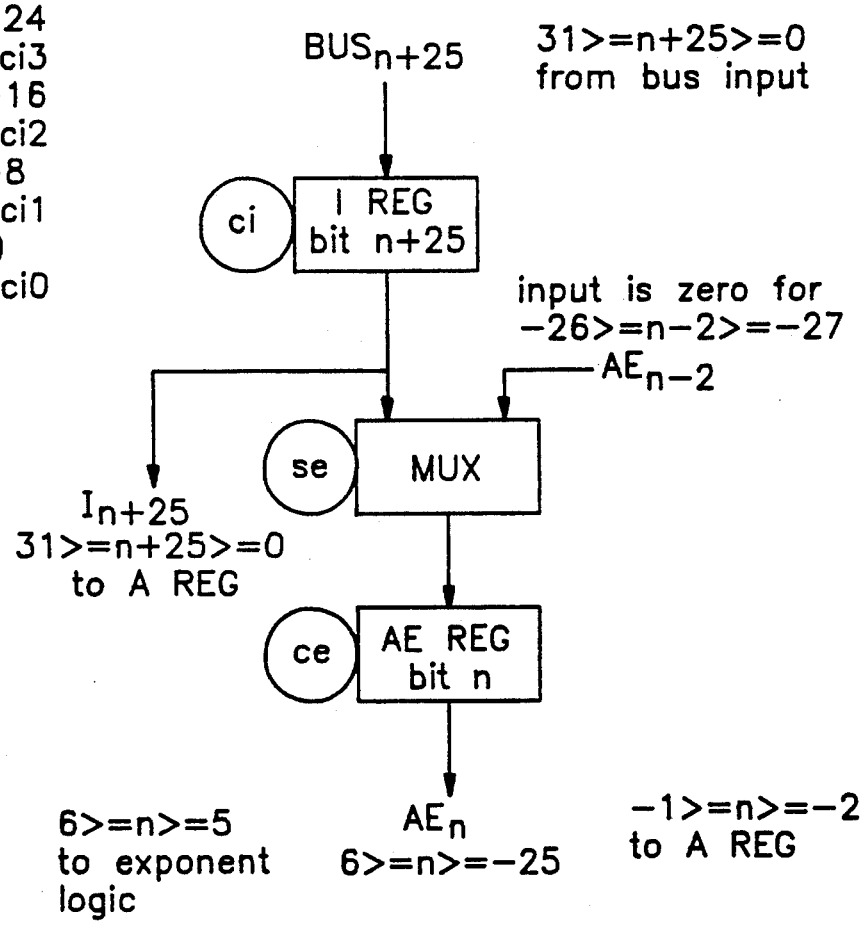
FIG. 19 is a schematic diagram of an input register for the modulo exponentiator device.
Figure 20:
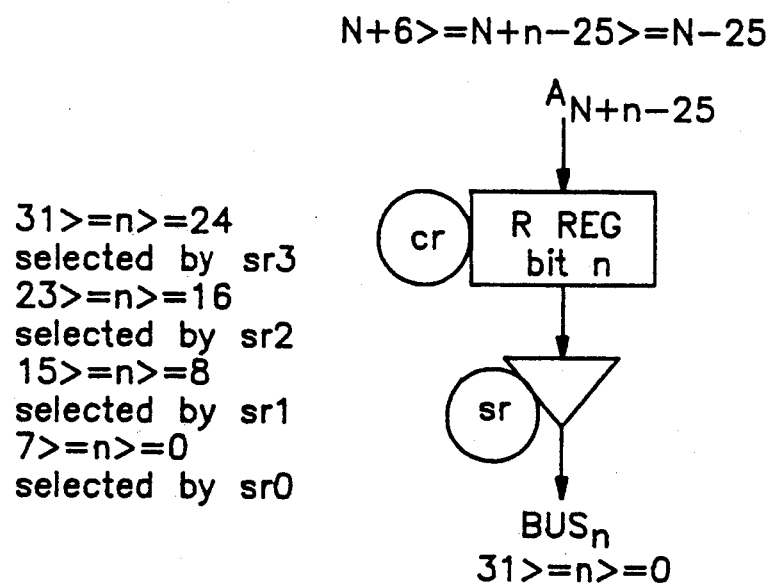
FIG. 20 is a schematic diagram of an output register for the modulo exponentiator device.

In FIGS. 19 and 20, examples of the input and output registers I-REG and R-REG (111 and 118 in FIG. 11) are shown. When the I register output is transferred to any destination, all four of the status bits are cleared. The operation of the loading logic depends on whether the control logic is in the input mode or the exponent mode. In both input and exponent modes, the control logic repeats a 18-step cycle: the first step is waiting for the I register to be full (or checking that it is full). In the second step, the I register is transferred to the AE register, and in 16 more steps, the AE register is shifted two bits at a time. In the input mode, part of the I register is also transferred to the A register, and the A register is also shifted.

In the input mode, bits I(31), . . . , I(25) are transferred to A(6), . . . , A(0), and bits I(24), . . . , I(0) are transferred to AE(−1), A(−25). Bits I(31), I(25) may also be transferred to AE(6), . . . , A(0), but these bits are not used in this mode. For the transfer to AE, the multiplexer control "se" shown in FIG. 19 must select the I register inputs, and the clock "ce" must be enabled. For the transfer to A, bits I(3), . . . , I(25) are added to A(6), . . . , A(0) in the least-significant carry-save slice, but since bits A(6), A(0) are zero prior to the transfer, the addition actually accomplishes a simple transfer. During the transfer to the least-significant carry-save slice, the other carry-save slices do not need to be clocked. When shifting in the input mode, zeros are shifted into the AE register, and the AE register shifted to the A register. To shift the AE register, the "se" multiplexer control selects the AE(n−2) multiplexer inputs while the "ce" clock is enabled.

Operation of the loading logic in the exponent mode is similar to the input mode except that all of the AE register is used and the A register is not involved in the loading or shifting, because AE(6), AE(0) takes the place of A(6), A(0). After I(31), . . . , I(0) is transferred to AE(6), . . . , AE(−25), the exponentiation control logic examines bit AE(6), then bit AE(5), before each two-bit shift of the AE register. After 16 shifts (shifting 32 bits), the cycle can begin again by checking (or waiting) for the I register to be full, then transferring I to AE again.

FIG. 20 shows a one-bit slice of the output register. The logic for shifting the accumulator and transferring data from the accumulator to the R register ("unloading" logic) operates only in the output mode. However, the logic for transferring data from the R register to the bus ("bus output" logic) operates in all modes. In the output mode, the control logic repeats an 18-step cycle. The first step is waiting for the R register to be empty (or checking that it is empty). In the second step, the A register is transferred to the R register, and in 16 more steps, the A register is shifted two bits at a time. Prior to unloading, the output command converts the result in the accumulator to an unsigned format, thus making the sign bit in bit position $N+7$ equal to zero; therefore, the sign bit is not unloaded. When the A register is transferred to the R register, bits $A(N+6), \ldots, A(N-25)$ are transferred to bits $R(31), \ldots, R(0)$. Shifting the accumulato two bits at a time for 16 steps shifts the next 32 bits of the result data in the accumulator into bit positions $N+6, \ldots, N-25$, in preparation for the next unloading cycle. This shifting operation is the same as for the input loading operation, except that the AE register does not need to be also shifted.

The bus output logic operates in all modes, thus making it possible for external software to fetch the last output word after the output mode has terminated, while the exponentiator logic may be processing the next command. Result register bits $R(31), \ldots, R(0)$ are connected to bus bits $BUS(31), \ldots, BUS(0)$. The data transfer to the bus is enabled by four strobe inputs, sr3, sr2, sr1, and sr0, for bit increments of 8 bits each.

The modulo exponentiator device of the present invention thus performs an innovative computation algorithm which is simplified as modulo multiplication operations implemented as a series of addition, shifting, and modulo operations performed on registers. The bit-lengths of intermediate data are kept to the range of the bit-length of the modulus by the distribution of the modulo operation with each multiplication. The arithmetic logic is implemented in bit slice architecture in carry-save elements and control logic elements, and these elements are combined in a master device which can be cascaded with similar slave devices for handling longer numbers. The arithmetic logic is particularly suitable for implementation in a GaAs integrated circuit for high-speed modulo exponentiation. Test analysis indicates that the device of the invention can perform a 512-bit modulo exponentiation function in under 2 ms, as compared to a highest speed of 25 ms with devices currently available. The cascadable architecture can easily accommodate exponentiation of very large operands if needed, while limiting the required gate density per IC device. The high-speed, high-capacity device offers great advantages for public key encryption systems, key management systems for real-time applications, and secure data networks.

We claim:

1. A high-speed modulo exponentiator device for performing a modulo experimentation function of the form $C = B^E$ (Modulo M), wherein E is a large positive integer and B and M are large integers, as a series of modulo multiplication operations of the form $P = (X * Y)$ (Modulo M), wherein X and Y are operands of the exponentiation function in binary form, comprising:

digital integrated circuit ("IC") means having an X register, a Y register, and an A register for computing each modulo multiplication operation, said X, Y, and A registers being interconnected and operative with control means for carrying out a loop computation using said X, Y, and A registers including:

(a) first register control means for computing an xf factor based upon three most significant bits of Y, (b) second register control means for computing $4*A + xf*X$ and transferring the result to the A register, (c) third register control means for determining an mf factor based upon a comparison of A with selected threshold values of M, (d) fourth register control means for computing $A + mf*M$ and transferring the result to the A register, and (e) fifth register control means for shifting the bits of the Y register two bits to the left (two most significant bits of Y) and returning control to said first register control means until said loop computation is completed.

2. A high-speed modulo exponentiator device according to claim 1, wherein said digital IC means is implemented as a gallium arsenide (GaAs) IC device.

3. A high-speed modulo exponentiator device according to claim 1, wherein said digital IC means is implemented with a bit slice architecture.

4. A high-speed modulo exponentiator device according to claim 3, wherein said digital IC means includes a plurality of bit slice units combined in a carry-save element.

5. A high-speed modulo exponentiator device according to claim 4, wherein said digital IC means includes a plurality of carry-save elements combined in an exponentiator device.

6. A high-speed modulo exponentiator device according to claim 5, wherein said digital IC means includes a master exponentiator device having input/output and control logic elements combined therewith.

7. A high-speed modulo exponentiator device according to claim 6, wherein said master exponentiator device includes a most-significant bits carry-save element and a least-significant bits carry-save element.

8. A high-speed modulo exponentiator device according to claim 6, wherein said master exponentiator device includes a in-boundary carry-save element and an out-boundary carry-save element for transferring data bits across device boundaries.

9. A high-speed modulo exponentiator device according to claim 6, wherein said digital IC means includes slave exponentiator devices cascaded with said master exponentiator devices.

10. A high-speed modulo exponentiator device according to claim 1, wherein said digital IC means is incorporated in a public key encryption system for encrypting a base argument B using a public key of an exponent E and a modulus M.

11. A method for performing a modulo exponentiation function of the form $C = B^E$ (Modulo M), wherein E is a large positive integer and B and M are large integers, as a series of modulo multiplication operations of the form $P = (X * Y)$ (Modulo M), wherein X and Y are operands of the exponentiation function in binary form, comprising the steps of:

(a) providing an X register, a Y register, and an A register, and control means for carrying out a loop computation using said X, Y, and A registers;

(b) computing an xf factor based upon three most significant bits of Y, (c) computing 4*A+xf*X and transferring the result to the A register,
(d) determining an mf factor based upon a comparison of A with selected threshold values of M,
(e) computing A+mf*M and transferring the result to the A register,
(f) shifting the bits of the Y register two bits to the left (two most significant bits of Y) and returning to step (a) above until said loop computation is completed, and
(g) providing an output from the A register at the completion of said loop computation as the result of the modulo multiplication operation.

12. A method for performing a modulo exponentiation function according to claim 11, wherein said step of computing the xf factor includes employing an extended Booth algorithm to obtain $xf = -2*y(MSB) + -1*y(MSB-1) + 1*y(MSB-2)$, where $y(MSB)$, $y(MSB-1)$, $y(MSB-2)$ are three most-significant bits of Y.

13. A method for performing a modulo exponentiation function according to claim 11, wherein said step of determining includes determining mf as a multiple of $-2, -1, 0, 1,$ or $2$ times 128 based upon comparing eight most-significant bits of A with four selected threshold values of M.

14. A method for performing a modulo exponentiation function according to claim 11, wherein said X, Y, and A registers have bit lengths of n, and further comprising the step of scaling up the operands X and Y to n bits whenever their bit lengths are less than n.

15. A method for performing a modulo exponentiation function according to claim 11, further comprising the step of implementing steps (a) through (g) as register operations in an IC circuit.

16. A method for performing a modulo exponentiation function according to claim 15, wherein said implementing step includes employing a bit slice architecture in carry-save elements of an IC exponentiator device.

17. A high-speed modulo exponentiator device for performing a modulo exponentiation function of the form $C = B^E$ (Modulo M), wherein E is a large positive integer and B and M are large integers, as a series of modulo multiplication operations of the form $P = (X * Y)$ (Modulo M), wherein X and Y are operands of the exponentiation function in binary form, based upon an extended Booth algorithm, comprising:

digital integrated circuit ("IC") means including an X register, a Y register, and an A register having bit lengths of n and initialized with operand X, operand Y, and 0, respectively, said X, Y, and A registers being interconnected and operative with control means for carrying out a loop computation using said X, Y, and A registers for $k = (n-1)/2, \ldots, 0$, when n is an odd number, and $k = (n-2)/2, \ldots, 0$, when n is an even number, wherein said control means includes:

(a) first register control means for computing $xf(k) = -2*y(MSB) + 1*y(MSB-1) + -1*y(MSB-2)$, where $y(MSB)$, $y(MSB-1)$, $y(MSB-2)$ are three most significant bits of Y;
(b) second register control means for computing $4*A + xf(k)*X$ and transferring the result to the A register;
(c) third register control means for determining mf(k), wherein mf(k) is a multiple of $-2, -1, 0, 1,$ or $2$ times 128, depending upon a comparison of eight most-significant bits of A with four selected threshold values of M;
(d) fourth register control means for computing $A + mf(k)*M$ and transferring the result to the A register; and
(e) fifth register control means for shifting the bits of the Y register two bits to the left (two most significant bits of Y) and returning control to said first register control means until said loop computation is completed.

18. A high-speed modulo exponentiator device according to claim 17, wherein said second and fourth register control means perform multiplication functions by shifting the bits of said X, Y, and M registers.

* * * * *

UNITED STATES PATENT AND TRADEMARK OFFICE
CERTIFICATE OF CORRECTION

PATENT NO. : 5,289,397
DATED : February 22, 1994
INVENTOR(S) : Clark et al.

It is certified that error appears in the above-identified patent and that said Letters Patent is hereby corrected as shown below:

Col. 39, claim 1, line 58, delete "experimentation" and
    insert --exponentiation--.

Signed and Sealed this

Twenty-sixth Day of July, 1994

Attest:

BRUCE LEHMAN

*Attesting Officer*     *Commissioner of Patents and Trademarks*